US008930583B1

(12) United States Patent
Shapira et al.

(10) Patent No.: US 8,930,583 B1
(45) Date of Patent: *Jan. 6, 2015

(54) METHOD AND APPARATUS FOR CONTROLLING DATA TRANSFER IN A SERIAL-ATA SYSTEM

(75) Inventors: Yaniv Shapira, Bet-Dagan (IL); Hrvoje Billic, Haifa (IE)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 444 days.

This patent is subject to a terminal disclaimer.

(21) Appl. No.: 10/666,655

(22) Filed: Sep. 18, 2003

(51) Int. Cl.
*G06F 3/00* (2006.01)

(52) U.S. Cl.
USPC .................................. 710/5; 710/36; 710/39

(58) Field of Classification Search
USPC .......................................... 710/5, 33; 712/225
See application file for complete search history.

(56) References Cited

U.S. PATENT DOCUMENTS

| | | | |
|---|---|---|---|
| 4,456,965 A | 6/1984 | Graber et al. |
| 4,747,047 A | 5/1988 | Coogan et al. |
| 5,210,855 A | 5/1993 | Bartol |
| 5,220,275 A | 6/1993 | Holmqvist |
| 5,222,062 A | 6/1993 | Sharma et al. |
| 5,274,665 A | 12/1993 | Schilling |
| 5,331,646 A | 7/1994 | Krueger et al. |
| 5,446,767 A | 8/1995 | Nakagawa et al. |
| 5,471,152 A | 11/1995 | Gheewala et al. |
| 5,471,585 A | 11/1995 | Barakat et al. |
| 5,530,960 A | 6/1996 | Parks et al. |
| 5,542,110 A | 7/1996 | Minagawa |
| 5,553,230 A | 9/1996 | Petersen et al. |
| 5,564,114 A | 10/1996 | Popat et al. |
| 5,661,765 A | 8/1997 | Ishizu |
| 5,748,645 A | 5/1998 | Hunter et al. |
| 5,783,960 A | 7/1998 | Lackey |
| 5,787,112 A | 7/1998 | Murai |

(Continued)

FOREIGN PATENT DOCUMENTS

| | | |
|---|---|---|
| EP | 0876016 A1 | 11/1998 |
| GB | 2408624 A | 6/2005 |

OTHER PUBLICATIONS

Serial ATA in Servers and Networked Storage; Copyright 2002; APT Technologies, Inc., Dell Computer corporation, Intel Corporation, Maxtor Corporation, Seagate Technology; pp. 7-10; http://www.serialata.org/whitepapers.asp.*

(Continued)

*Primary Examiner* — Idriss N Alrobaye
*Assistant Examiner* — Richard B Franklin

(57) ABSTRACT

A method for controlling data transfer in a serial-ATA system includes using serial-ATA Native Command Queuing (NCQ) to issue a queue of NCQ commands to at least two serial-ATA devices. The commands include a first plurality of commands for a first one of the devices and a second plurality of commands for a second one of the devices. Each of the commands includes a respective port address of one of the at least two devices and a first command identifier identifying a command for the one of the at least two devices. The method further includes receiving a first acknowledgement, which has a port address of a first target device and a second command identifier identifying a first outstanding command for the first target device. Each of the queues of commands is sent to the at least two serial-ATA devices prior to receiving the first acknowledgement.

44 Claims, 18 Drawing Sheets

(56) References Cited

U.S. PATENT DOCUMENTS

| | | |
|---|---|---|
| 5,787,485 A | 7/1998 | Fitzgerald et al. |
| 5,802,318 A | 9/1998 | Murray et al. |
| 5,812,754 A | 9/1998 | Lui et al. |
| 5,826,048 A | 10/1998 | Dempsey et al. |
| 5,828,854 A | 10/1998 | Wade |
| 5,848,278 A | 12/1998 | Sakai |
| 5,854,941 A | 12/1998 | Ballard et al. |
| 5,886,901 A | 3/1999 | Magoshi |
| 5,894,560 A | 4/1999 | Carmichael et al. |
| 5,909,451 A | 6/1999 | Lach et al. |
| 6,009,275 A | 12/1999 | DeKoning et al. |
| 6,021,462 A | 2/2000 | Minow et al. |
| 6,038,267 A | 3/2000 | Oura et al. |
| 6,057,863 A | 5/2000 | Olarig |
| 6,059,836 A | 5/2000 | Liguori |
| 6,073,188 A | 6/2000 | Fleming |
| 6,092,169 A | 7/2000 | Murthy et al. |
| 6,106,568 A | 8/2000 | Beausang et al. |
| 6,124,727 A | 9/2000 | Bridgewater, Jr. et al. |
| 6,148,366 A | 11/2000 | Watanabe |
| 6,178,215 B1 | 1/2001 | Zhang et al. |
| 6,223,238 B1 | 4/2001 | Meyer et al. |
| 6,237,052 B1 | 5/2001 | Stolowitz |
| 6,314,145 B1 | 11/2001 | van Driest |
| 6,330,687 B1 | 12/2001 | Griffith |
| 6,363,439 B1 | 3/2002 | Battles et al. |
| 6,367,033 B1 | 4/2002 | Jibbe |
| 6,378,039 B1 | 4/2002 | Obara et al. |
| 6,388,590 B1 | 5/2002 | Ng |
| 6,388,591 B1 | 5/2002 | Ng |
| 6,442,722 B1 | 8/2002 | Nadeau-Dostie et al. |
| 6,447,340 B1 | 9/2002 | Wu |
| 6,447,655 B2 | 9/2002 | Lantsman |
| 6,480,930 B1 | 11/2002 | Zakai et al. |
| 6,484,294 B1 | 11/2002 | Kiyoshige et al. |
| 6,496,900 B1 | 12/2002 | McDonald et al. |
| 6,505,250 B2 | 1/2003 | Freund et al. |
| 6,549,981 B2 | 4/2003 | McDonald et al. |
| 6,557,065 B1 | 4/2003 | Peleg et al. |
| 6,564,271 B2 | 5/2003 | Micalizzi, Jr. et al. |
| 6,578,126 B1 | 6/2003 | MacLellan et al. |
| 6,614,842 B1 | 9/2003 | Chou et al. |
| 6,639,885 B1 | 10/2003 | Yada et al. |
| 6,662,076 B1 | 12/2003 | Conboy et al. |
| 6,678,768 B1 | 1/2004 | Craft |
| 6,687,775 B1 | 2/2004 | Bassett |
| 6,697,867 B1 | 2/2004 | Chong, Jr. |
| 6,697,885 B1 | 2/2004 | Goodfellow |
| 6,704,300 B1 | 3/2004 | Chen et al. |
| 6,731,688 B1 | 5/2004 | Johnson |
| 6,735,650 B1 | 5/2004 | Rothberg |
| 6,791,779 B1 | 9/2004 | Singh et al. |
| 6,792,494 B2 | 9/2004 | Bennett et al. |
| 6,813,688 B2 | 11/2004 | Wu et al. |
| 6,819,187 B1 | 11/2004 | Ming et al. |
| 6,845,420 B2 | 1/2005 | Resnick |
| 6,854,045 B2 | 2/2005 | Ooi et al. |
| 6,895,455 B1 | 5/2005 | Rothberg |
| 6,898,655 B1 | 5/2005 | Sutardja |
| 6,904,553 B1 | 6/2005 | Brown |
| 6,908,330 B2 | 6/2005 | Garrett et al. |
| 6,915,380 B2 | 7/2005 | Tanaka et al. |
| 6,917,992 B2 * | 7/2005 | Grimsrud et al. ............... 710/74 |
| 6,922,738 B2 | 7/2005 | Drescher et al. |
| 6,928,509 B2 | 8/2005 | Surugucchi |
| 6,961,813 B2 | 11/2005 | Grieff et al. |
| 6,973,535 B2 | 12/2005 | Bruner et al. |
| 6,978,337 B1 | 12/2005 | Chang |
| 7,039,737 B1 | 5/2006 | Dorr et al. |
| 7,089,345 B1 * | 8/2006 | Lynn ............................ 710/316 |
| 7,103,496 B2 | 9/2006 | Hong |
| 7,111,158 B1 | 9/2006 | Burroughs et al. |
| 7,171,525 B1 | 1/2007 | Norman et al. |
| 7,200,698 B1 | 4/2007 | Rothberg |
| 7,206,843 B1 | 4/2007 | Allavarpu et al. |
| 7,246,192 B1 | 7/2007 | Chang |
| 7,263,153 B2 | 8/2007 | Sutioso et al. |
| 7,319,705 B1 | 1/2008 | Wu |
| 7,360,119 B1 | 4/2008 | Stenfort et al. |
| 7,373,568 B1 | 5/2008 | Horovitz |
| 2002/0111929 A1 | 8/2002 | Pudipeddi et al. |
| 2002/0144901 A1 | 10/2002 | Nulman et al. |
| 2002/0159311 A1 | 10/2002 | Coffey et al. |
| 2002/0173925 A1 | 11/2002 | Sugawara et al. |
| 2002/0186706 A1 | 12/2002 | Chien et al. |
| 2003/0005231 A1 | 1/2003 | Ooi et al. |
| 2003/0035504 A1 | 2/2003 | Wong et al. |
| 2003/0074515 A1 | 4/2003 | Resnick |
| 2003/0081743 A1 | 5/2003 | Chiang et al. |
| 2003/0088591 A1 | 5/2003 | Fish |
| 2003/0131125 A1 | 7/2003 | Ooi |
| 2003/0135577 A1 | 7/2003 | Weber et al. |
| 2003/0145264 A1 | 7/2003 | Siegel et al. |
| 2003/0167367 A1 | 9/2003 | Kaushik et al. |
| 2003/0236952 A1 * | 12/2003 | Grieff et al. ................... 711/151 |
| 2004/0015637 A1 | 1/2004 | Yau |
| 2004/0024950 A1 | 2/2004 | Surugucchi |
| 2004/0044802 A1 | 3/2004 | Chiang et al. |
| 2004/0068591 A1 | 4/2004 | Workman et al. |
| 2004/0071251 A1 | 4/2004 | Sutioso et al. |
| 2004/0081179 A1 | 4/2004 | Gregorcyk, Jr. |
| 2004/0083323 A1 | 4/2004 | Rabinovitz et al. |
| 2004/0083324 A1 | 4/2004 | Rabinovitz et al. |
| 2004/0088441 A1 | 5/2004 | Chiang et al. |
| 2004/0097124 A1 | 5/2004 | Garrett et al. |
| 2004/0100944 A1 * | 5/2004 | Richmond et al. ............ 370/360 |
| 2004/0113662 A1 | 6/2004 | Grumsrud |
| 2004/0117522 A1 | 6/2004 | Loffink et al. |
| 2004/0120353 A1 | 6/2004 | Kim et al. |
| 2004/0128627 A1 | 7/2004 | Zayas |
| 2004/0151040 A1 | 8/2004 | Minami |
| 2004/0193737 A1 | 9/2004 | Huffman |
| 2004/0198104 A1 | 10/2004 | Hadba et al. |
| 2004/0199515 A1 | 10/2004 | Penny et al. |
| 2004/0203295 A1 | 10/2004 | Hadba et al. |
| 2004/0205288 A1 * | 10/2004 | Ghaffari et al. ............... 711/100 |
| 2004/0252672 A1 | 12/2004 | Nemazie |
| 2004/0252716 A1 | 12/2004 | Nemazie |
| 2004/0264284 A1 | 12/2004 | Priborsky et al. |
| 2005/0005216 A1 | 1/2005 | Ghameshlu et al. |
| 2005/0015655 A1 * | 1/2005 | Clayton et al. .................... 714/6 |
| 2005/0024083 A1 | 2/2005 | Kitamura et al. |
| 2005/0027894 A1 | 2/2005 | Ayyavu et al. |
| 2005/0055501 A1 | 3/2005 | Guha et al. |
| 2005/0102468 A1 | 5/2005 | Delaney et al. |
| 2005/0144490 A1 | 6/2005 | Igari |
| 2005/0186832 A1 | 8/2005 | Nemazie |
| 2005/0204078 A1 | 9/2005 | Steinmetz et al. |
| 2005/0229249 A1 | 10/2005 | Piwonka et al. |
| 2005/0242919 A1 | 11/2005 | Wang et al. |
| 2005/0246475 A1 | 11/2005 | Ervin |
| 2005/0251588 A1 | 11/2005 | Hoch et al. |
| 2005/0289262 A1 | 12/2005 | Sutardja |
| 2008/0310330 A1 | 12/2008 | Agazzi et al. |

OTHER PUBLICATIONS

Serial ATA II Specification Connectivity Expansion through RSM; Apr. 30, 2002; Revision 0.6; pp. 1-33.*
Serial ATA II: Extensions to Serial ATA 1.0; Oct. 16, 2002; Revision 1.0; pp. 1-79.*
Serial ATA: High Speed Serialized AT Attachment; Aug. 21, 2001; Revision 1.0; p. 297.*
Andrew S. Tanenbaum; Structured Computer Organization; 1984; Prentice-Hall, Inc.; Second Edition; pp. 10 and 11.*
Serial ATA: High Speed Serialized AT Attachment, Revision 1.0, Aug. 29, 2001, APT Technologies, Inc., Dell Computer Corporation, IBM Corporation, Intel Corporation, Maxtor Corporation, Seagate Technology.
Serial ATA II: Port Multiplier, Revision 1.0, Mar. 25, 2003, APT Technologies, Inc., Dell Computer Corporation, Intel Corporation, Maxtor Corporation, Seagate Technology.
Proposed Draft, Serial ATA II Workgroup, Revision 1.0RC, Jun. 23, 2003, Serial ATA II Specification—Port Selection.

(56) References Cited

OTHER PUBLICATIONS

Serial ATA II: Extensions to Serial ATA 1.0, Revision 1.0, Oct. 16, 2002, APT Technologies, Inc., Dell Computer Corporation, Intel Corporation, Maxtor Corporation, Seagate Technology.
Working Draft, T13—1410D, Revision 3, Oct. 30, 2001, Information Technology—AT Attachment with Packet Interface—6 (ATA/ATAPI-6).
SIIG Inc., "Serial ATA-to Ultra ATA adapter," SIIG, Inc.
Sonnet Inc., "Tempo Bridge", Sonnet Inc.
Mark Kyrnin, "Serial ATA", About.com.
Seagate, "Frequently Asked Questions", Seagate Technology LLC, http://www.seagate.com/products/interface/sata/faq.html.
Nanda, Sanjeeb, "SATA vs. PATA," Nov. 2002, Computer Technology Review, p. 18.
Benway, Alan, "Taking a Ride on the Bus," Apr. 2000, Server Workstation Expert, p. 32 and 34-37 (5 pages).
Benway, Alan, "RAID Anatomy 101," Oct. 2000, Server Workstation Expert, p. 36-45 (7 pages).
"The Authoritative Dictionary of IEEE Standards Terms, Seventh Edition," Dec. 2000, IEEE, p. 123-124.
SATA PHY Interface Specification (SAPIS) Draft—Rev 0/90 Feb. 8, 2002, pp. 1-12.
Serial ATA: High Speed Serialized AT Attachment Revision 1.0a, Jan. 7, 2003, pp. 1-310.
"Serial ATA: A Comparison with Ultra ATA Technology", SATA-IO: Enabling the Future; http://www.sata-io.org/stattechnology.asp; Dec. 15, 2004, pp. 1-7.
Serial ATA II: Port Selector, Revision 1.0, Jul. 28, 2003, Dell Computer Corporation, Intel Corporation, Maxtor Corporation, Seagate Technology, Vitesse Semiconductor Corporation. 20 pages.
U.S. Appl. No. 10/175,925, Jun. 2002, Medina.
U.S. Appl. No. 10/666,959, Sep. 2003, Shapira.
U.S. Appl. No. 10/667,192, Sep. 2003, Shapira.
U.S. Appl. No. 10/667,196, Sep. 2003, Shapira.
U.S. Appl. No. 10/667,197, Sep. 2003, Shapira.
U.S. Appl. No. 10/795,727, Mar. 2004, Chang.
Ghaffari, et al.—U.S. Appl. No. 60/462,336, filed Apr. 14, 2003, pp. 1-11.
Dictionary of Computers, Information Processing & Telecommunications, 2nd Edition, Jerry M. Rosenberg, 1987, pp. 8, 119 and 128.
Errata to "Serial ATA: High Speed Serialized AT Attachment," Serial ATA Organization, Revision 1.0, Errata dated May 24, 2002, 46 pages.
Serial ATA Bridge Chip Solution 88i8030, Marvell, copyright May 2002, 2 pages.
Spread Spectrum Scene; http://sss-mag.com/ss.html#tutorial; Mar. 27, 2007; pp. 1-6.
Serial ATA Next Generation Storage Interface; Mark Kymin; Jun. 9, 2005; pp. 1-6.
SATA Technology; www.sata.or.org; Dec. 15, 2004; 8 pages.
Serial ATA II Workgroup; Serial ATA II Specification Port Selector, Proposed Draft; Revision 1.0RC, Jun. 23, 2003; 21 pages.
Serial ATA II: Port Selector, Revision 1.0, Jul. 28, 2003; Dell Computer Corporation, Intel Corporation, Maxtor Corporation, Seagate Technology, Vitesse Semiconductor Corporation; 20 pages.
"Group Announces Serial ATA Spec; bridge chips help you meet it," Greg Vrana, Nov. 8, 2001.

\* cited by examiner

Register Host To Device DIS Layout — Write FPDMA QUEUED

| | Features | Command | C | R | R | PM Port | FIS Type |
|---|---|---|---|---|---|---|---|
| Dword 0 | Sector Count 7:0 | 61h | C | 0 | 0 | PM Port | 27h |
| Dword 1 | Dev / Head | Cyl High | | Cyl Low | | | Sector Number |
| | FUA 1 0 0 Reserved | LBA 23:16 | | LBA 15:8 | | | LBA 7:0 |
| Dword 2 | Features (exp) | Cyl High (exp) | | Cyl Low (exp) | | | Sector Number (exp) |
| | Sector Count 15:8 | LBA 47:40 | | LBA 39:32 | | | LBA 31:24 |
| Dword 3 | Control | Reserved | | Sector Count (exp) | | | Sector Count |
| | Control | Reserved | | Reserved | | | Tag  Reserved |
| Dword 4 | Reserved | 0 | | 0 | | | 0 |
| | 0 | | | | | | |

FIG. 6

METHOD AND APPARATUS FOR CONTROLLING DATA TRANSFER IN A SERIAL-ATA SYSTEM

CROSS-REFERENCE TO RELATED APPLICATIONS

This application incorporates by reference the following patent applications filed on the same day as the present application: U.S. application Ser. No. 10/667,197 entitled Communication Channel between Serial-ATA Host Controllers, U.S. application Ser. No. 10/667,192 entitled Queued Command-based Switching Serial-ATA Port Multiplier U.S. application Ser. No. 10/666,959 entitled Method and Apparatus for Controlling Data Transfer in a Serial-ATA System U.S. application Ser. No. 10/667,196 entitled Serial-ATA Host Controller Supporting Both QDMA Commands and NCQ Commands.

BACKGROUND OF THE INVENTION

1. Field of the Invention

The present invention relates to serial-ATA, and more specifically to a queued command-based switching serial-ATA port multiplier and host controller.

2. Description of the Related Art

In the Serial-ATA II: Port Multiplier specification, Revision 1.0 provided by the Serial ATA working group ("Serial-ATA II PM 1.0"), a port multiplier is defined as a mechanism for one active host connection to communicate with multiple devices, as shown in FIG. 1. A port multiplier 101 has one host port, one control port and a number of device ports. Device port addresses start at zero and are numbered sequentially higher until the last device port address has been defined. The host port is coupled to a host 102, and the device ports are coupled to devices 103a to 103n.

The port multiplier uses four bits, known as the PM Port Field, in all FIS (Frame Information Structure) types to route FISes between the host and the appropriate device. For a host-to-device FIS, the PM Port Field is filled in by the host with the port address of the device to route the FIS to. For a device-to-host FIS, the PM Port Field is filled in by the port multiplier with the port address of the device that is transmitting the FIS.

To transmit a FIS to a device connected to a port multiplier, the host sets the PM Port Field in the FIS to the device's port address. Then the host starts transmitting the FIS to the Port Multiplier according to the Serial ATA: High Speed Serialized AT Attachment, Revision 1.0 ("Serial-ATA 1.0 Specification"). When a port multiplier receives a FIS over the host port, the port multiplier checks the PM Port Field in the FIS to determine the port address that the FIS should be transmitted over.

To transmit a FIS to the host, the device proceeds with the transmission of the FISes to the port multiplier according to the Serial-ATA 1.0 Specification. The port multiplier fills in the PM Port Field with the port address of the transmitting device, and then transmits the modified FIS to the host.

Serial-ATA II PM 1.0 provides information for two switching types: FIS-based switching and command-based switching. If the host controller does not support hardware context switching based on the value of the PM Port Field in a received FIS, then the host utilizes command-based switching and may only have a command or commands outstanding to one device at any point in time.

The host has bandwidth to work with multiple devices simultaneously. However, because command-based switching only allows the host to have a command outstanding to one device at a time, the host cannot use that bandwidth. Therefore, it would be advantageous to provide a method and port multiplier for more efficient switching and data transfer between the host and the devices.

SUMMARY OF THE INVENTION

It is an object of the present invention to provide a queued command-based switching between a host and serial-ATA devices, such as disk drives. According to the present invention, a host controller, that does not support hardware context switching based on the value of the PM Port Field in a received FIS, can issue multiple commands to multiple devices at the same time. As a result, the present invention improves data transfer efficiency between the host and the devices.

The serial-ATA port multiplier of the present invention provides a locking mechanism. When a serial-ATA command is started, the port multiplier locks a specific port between a device and the host, and prevents intervention of other devices. Accordingly, other devices trying to access the host through the port multiplier are not acknowledged until the first started serial-ATA command is completed. Once the first started serial-ATA command is completed, the port multiplier releases the locked port and waits for additional commands.

It is another object of the present invention to provide a method for queued command-based switching, wherein the port multiplier releases the bus when a command has been queued, and locks the bus again when the device is ready to complete the data transaction of the queued command.

To further improve data transfer efficiency, the present invention uses a cache between the device port of the port multiplier and the device. During a read operation, all requested data are taken from the disk and staged on the cache before being transferred to the device port. During a write operation, all data to be written are staged on the cache before being received by the device. Thus, the port multiplier works against the cache, not the device.

It is a further object of the present invention to provide a method for controlling a serial-ATA port multiplier by a host controller in queued command-based switching. The host controller sends commands to multiple devices. Each of the commands contains the tag of the command and a device port number. When a device is ready to proceed with the data transaction, it sends back the tag of the command, and the port multiplier provides the information of the device port. Consequently, the host controller knows which type of data transaction to carry out and which device to transfer data with.

It is a further object of the present invention to provide a method for NCQ (Native Command Queuing) queued command-based switching, wherein the device sends a DMA (Direct Memory Access) Setup FIS when it is ready to complete the data transaction of the queued command.

It is a further object of the present invention to provide a method for QDMA (Queued Direct Memory Access) queued command-based switching, wherein the device sends a Set Device Bits FIS when it is ready to complete the data transaction of the queued command.

It is a further object of the present invention to provide a host controller, which provides a command to a device with a tag uniquely identifying the command and a device port address, and uses a request queue and a response queue mechanism to control NCQ queued command-based switching.

It is a further object of the present invention to provide a host controller, which provides a command to a device with a tag uniquely identifying the command and a device port address, so as to control QDMA queued command-based switching.

It is a further object of the present invention to provide a host controller which supports NCQ and QDMA commands. The host controller has a state machine for each operation mode, and a selection mechanism to choose an operation mode which best fits a particular device.

As described herein, the inventive host controller may be implemented in a variety of systems, including computers, servers, network attached storage (NAS) systems, storage area networks (SAN), and systems employing technology known as a redundant array of inexpensive disks (RAID) or JBOD (Just a Bunch of Disks). The device could be any serial-ATA device, which has a direct connection with the host by a non-shared media and has point to point communications with the host, including disk drives and removable storage devices.

BRIEF DESCRIPTION OF THE DRAWINGS

The present invention is described herein with reference to the accompanying drawings, similar reference numbers being used to indicate functionally similar elements.

FIG. 6 shows a Register—Host to Device FIS issued by a NCQ host controller used for queued command-based switching according to one embodiment of the present invention.

DETAILED DESCRIPTION OF EMBODIMENTS

I. Introduction

According to the Serial-ATA 1.0 Specification, communication layers between a host and a device include a physical layer, a link layer, a transport layer and an application layer. The link layer transmits and receives frames. A frame is a group of Dword (32 bits of data) that conveys information between host and device. Each frame includes a user payload called a FIS, as mentioned earlier. The transport layer constructs FISes for transmission and decomposes received FISes.

The Serial-ATA 1.0 Specification defines eight types of FIS. Several of them are relevant here. The first is a Register—Host to Device FIS used to transfer the contents of Control Block Register from the host to the device. Control Block Register are interface registers used for delivering commands to the device or posting status from the device.

The second relevant FIS type is DMA Activate—Device to Host, which is used by the device to signal its readiness to receive DMA data from the host, so that the host can proceed with a DMA data transfer from the host to the device. When the host needs to send multiple Data frames in order to complete the overall data transfer request, the host waits for a successful reception of a DMA Activate FIS before sending each of the Data FISes that are needed.

The third relevant FIS type is Set Device Bits—Device to Host FIS, which is used by the device to set the SERV bit in the Status Register to request service for a bus release command. The Set Device Bits—Device to Host includes a bit to signal the host controller to generate an interrupt if the BSY bit and the DRQ bit in the Shadow Status Register are both cleared to zero when this FIS is received.

The fourth relevant FIS type is DMA Setup—Device to Host or Host to Device FIS, which is used to request the host or device to program its DMA controller before transferring data, and to establish DMA hardware context for one or more data transfers.

A further relevant FIS type is Data—Host to Device or Device to Host.

Also according to the Serial-ATA 1.0 Specification, transmission of a Register—Host to Device FIS can be initiated by a write operation to the Command Register in the host controller's Control Block Register. Upon initiating transmission, the current contents of the Control Block Register are transmitted, and the host controller sets the BSY bit in the Shadow Status Register. Upon reception of a valid Register—Host to Device FIS from the Command Register, the device updates its local copy of the Command Register contents, and initiates execution of the command indicated in the Command Register.

II. Queued Command-Based Switching Serial-ATA Port Multiplier

Figure 1:
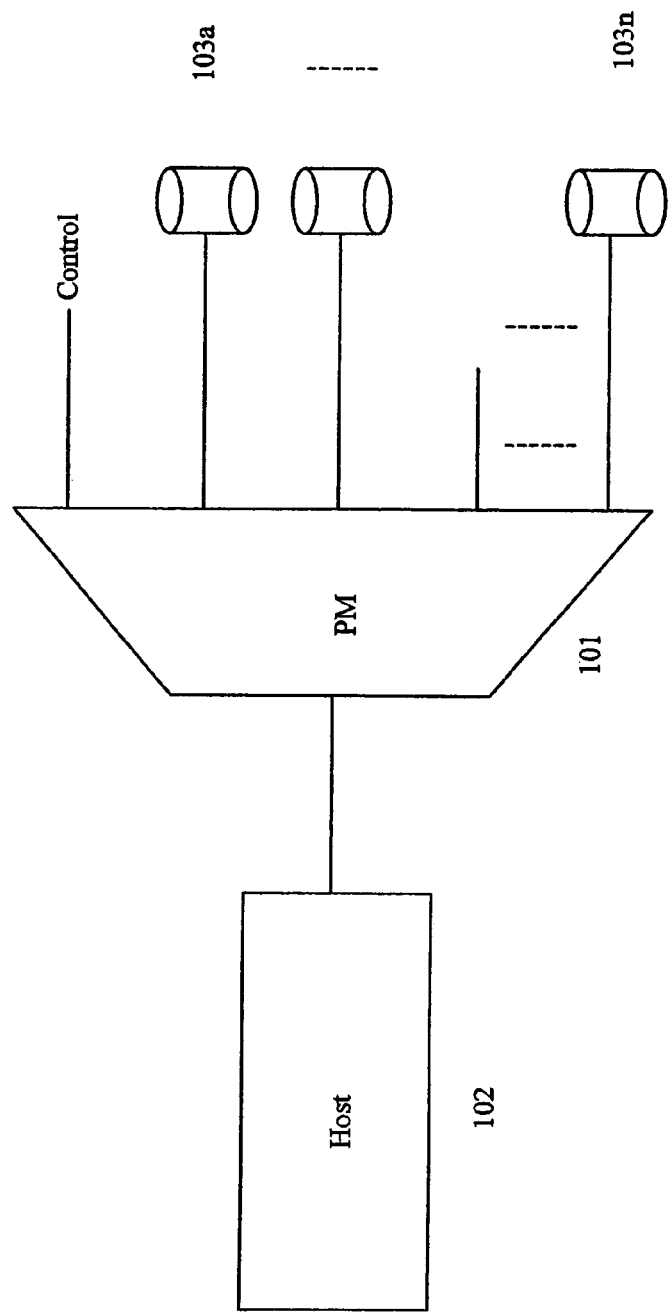
FIG. 1 shows a port multiplier as defined in Serial-ATA II PM 1.0.
Figure 2:
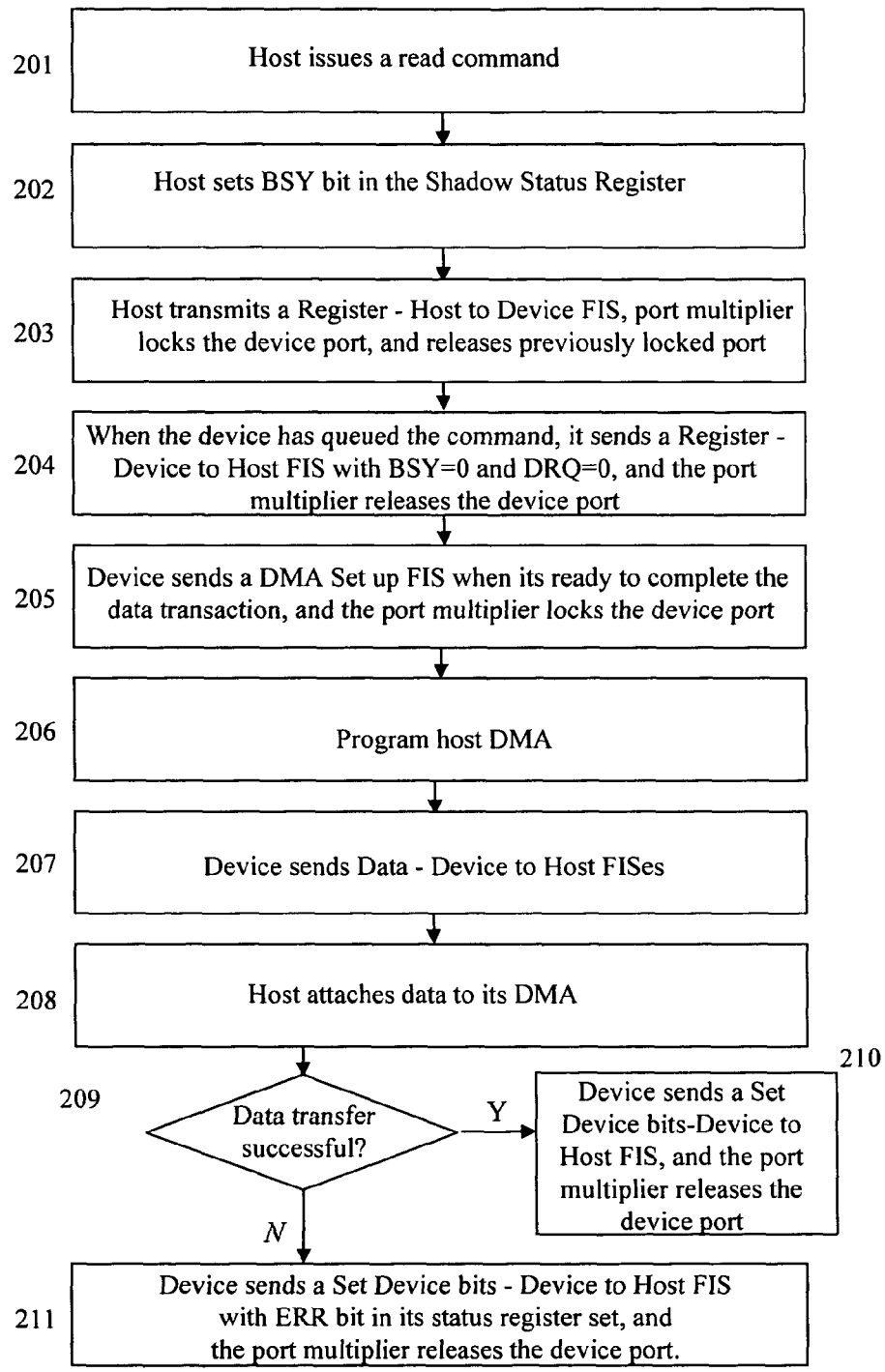
FIG. 2 shows a flow chart for a read operation of a queued command-based switching serial-ATA port multiplier in the NCQ mode according to one embodiment of the present invention.

FIG. 2 shows a flow chart for a read operation of a queued command-based switching serial-ATA port multiplier in the NCQ mode according to one embodiment of the present invention.

Serial-ATA II: Extensions to Serial ATA 1.0 ("Serial-ATA II Extensions 1.0") defines Native Command Queuing, which utilizes the reserved 32-bit field in the Set Device Bits FIS to convey the pending status for each of up to 32 outstanding commands. The state of the BSY bit in the Status Shadow Register is checked prior to attempting to issue a new queued command. If the BSY bit is set to one, issue of the next command is deferred until the BSY bit is cleared to zero. The native queuing commands include a tag value that uniquely identifies the command. The tag value is in the range 0 through 31 inclusive.

As defined in Serial-ATA II Extensions 1.0, Serial-ATA Native Command Queuing allows the host controller to issue concurrent commands to a device. Along with the command, the host controller provides a tag whose value uniquely identifies the command. When the device is ready to perform one of the NCQ commands, regardless of the command's order in the queue, it sends a DMA Setup FIS, which notifies the host controller with the TAG of the command. The host controller then identifies the command according to the TAG and restores the command parameters to execute the data transaction. A serial-ATA device supports up to 32 concurrent queued commands and may perform them out of order. As discussed below, the NCQ command sent by the host controller of the present invention also contains a device's port address in the PM Port field, and consequently can issue multiple NCQ commands to multiple devices at a time.

To initiate a read operation, the host controller updates all Command Registers and issues a read command at step 201. At step 202, the host controller sets the BSY bit in the Shadow Status Register. At step 203, the host controller transmits to a device a Register—Host to Device FIS. The Register—Host to Device FIS contains the device's port address in the PM Port Field indicating the device to be read, and a TAG in another field uniquely identifying that command. The port multiplier determines the device to be read according to the value of the PM Port Field in the FIS. The port multiplier then locks the device port between this device and the host. If there is an existing locked port, the port multiplier releases that device port.

At step 204, when the device has queued the command and wishes to release the bus, it sends a Register—Device to Host FIS with bits BSY=0 and DRQ=0. The port multiplier then releases the device port.

At step 205, when the device is ready to complete the data transaction of the queued command, it sends DMA Setup FIS to the host controller, sending back the TAG of the command to be performed. The port multiplier then determines the device that sends the DMA Setup FIS, locks the device port between the device and the host.

At step 206, the host DMA is programmed with the transfer parameters associated to the command identified by the received TAG. At step 207, the device sends Data—Device to Host FISes. At step 208, the host controller conceptually attaches data from the device to the host DMA. The data are added to the tail of a FIFO. Then the host DMA pulls the data from the head of the FIFO and forwards the data to its destination in the memory. Meanwhile, the FIFO flow control prevents the FIFO from being overloaded.

If it is determined at step 209 that the data transfer is successfully completed, at step 210, the device sends a Set Device bits—Device to Host FIS with command complete status, and the port multiplier releases the device port. Alternatively, if the data transfer contains an error, at step 211, the device sends a Set Device bits—Device to Host FIS with the ERR bit in status register of the FIS set, the BSY and DRQ bits in the Shadow Status Register are cleared to zero, and the port multiplier releases the device port.

Figure 3A:
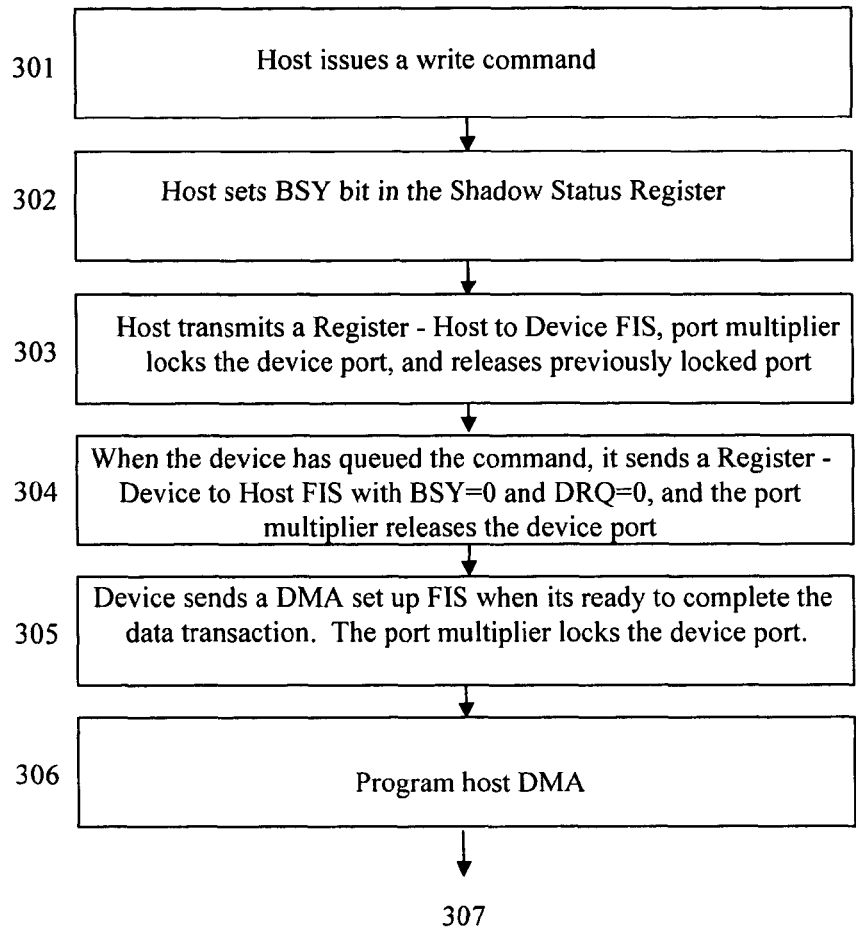
FIGS. 3A and 3B shows a flow chart for a write operation of a queued command-based switching serial-ATA port multiplier in the NCQ mode according to one embodiment of the present invention.
Figure 3B:
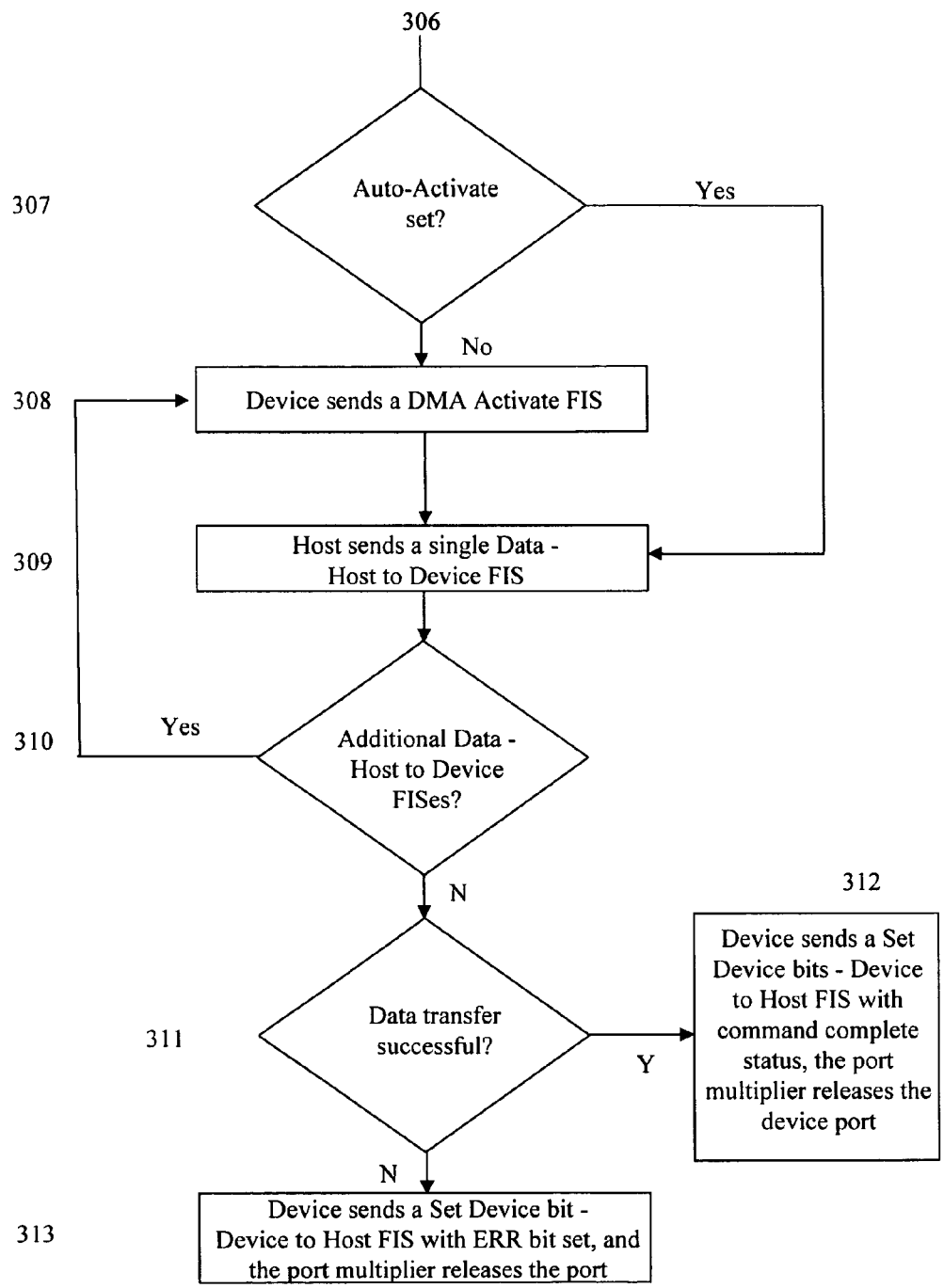

FIGS. 3A and 3B show a flow chart for a write operation of a queued command-based switching serial-ATA port multiplier in the NCQ mode according to one embodiment of the present invention.

To initiate a write operation, the host controller updates all Command Registers and issues a write command at step 301. At step 302, the host controller sets the BSY bit in the Shadow Status Register. At step 303, the host controller transmits a Register—Host to Device FIS. The Register—Host to Device FIS contains in its PM Port Field the port address of the target device, and in another field a TAG uniquely identifying the write command. The port multiplier determines the device to be written to according to the value of the PM Port Field in the FIS. The port multiplier then locks the device port between the device and the host. If there is an existing locked device port, the port multiplier releases that device port.

At step 304, when the device has queued the command and wishes to release the bus, it transmits a Register—Device to Host FIS with bits BSY and DRQ cleared to zero. The port multiplier then releases the device port.

At step 305, when the device is ready to complete the data transaction of the queued write command, it transmits DMA Setup FIS to the host, sending back the TAG of the command to be performed. The port multiplier determines the device that sends the DMA Setup FIS, and locks the device port between the device and the host.

At step 306, the host DMA is programmed with the transfer parameters associated to the command identified by the received TAG. If it is determined at step 307 that the Auto-Activate in the DMA Setup FIS is set, the operation proceeds to step 309.

When the device is ready to receive data, the device sends to the host a DMA Activate FIS at step 308. At step 309, the host sends a single Data—Host to Device FIS.

At step 310, if additional Data—Host to Device FISes are required to complete, then steps 308 to 309 are repeated. Otherwise, if it is determined at step 311 that the data transfer is successfully completed, at step 312, the device sends a Set Device bits—Device to Host FIS with command complete status, and port multiplier releases the device port. Alternatively, if the data transfer contains an error, at step 313, the device sends a Set Device bits—Device to Host FIS with the ERR bit of the status register of the FIS set, the BSY and DRQ bits in the Shadow Status Register are cleared, and the port multiplier releases the device port.

To speed up data transfer between the host and the device, a memory cache can be used to bridge the device and the port multiplier. As a result, when the host switches from one device port to another device port, it works against the high speed cache, instead of the low speed device.

The methods shown in FIGS. 2 and 3 not only allow the host controller to have multiple commands outstanding to multiple devices, but also save the device's data transaction preparation time, thus improving data transfer efficiency between the host and the device. The use of cache further increases data transfer speed.

Figure 4A:
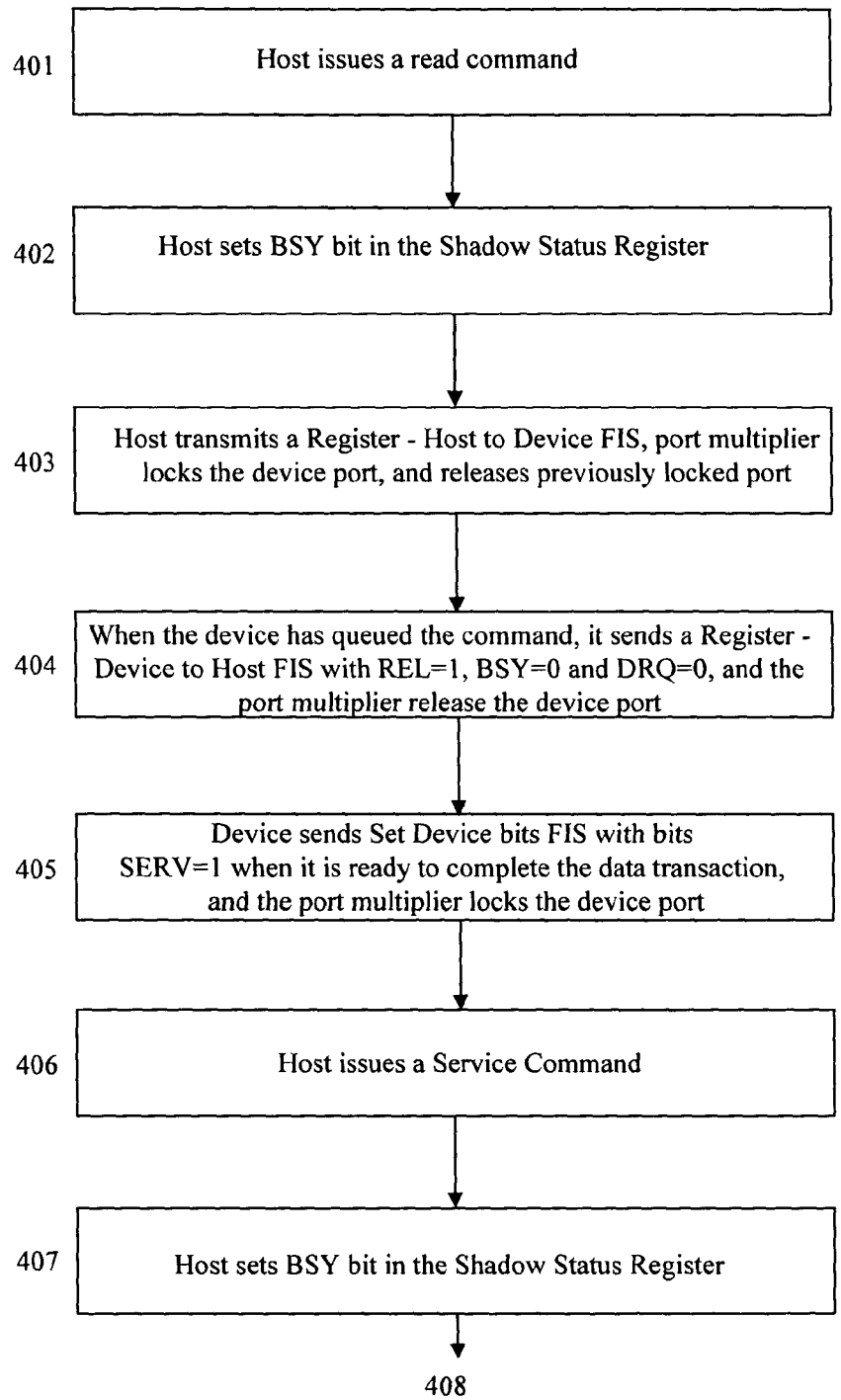
FIGS. 4A and 4B show a flow chart for a read operation of a queued command-based switching serial-ATA port multiplier supporting both NCQ operation mode and QDMA operation mode according to one embodiment of the present invention.
Figure 4B:
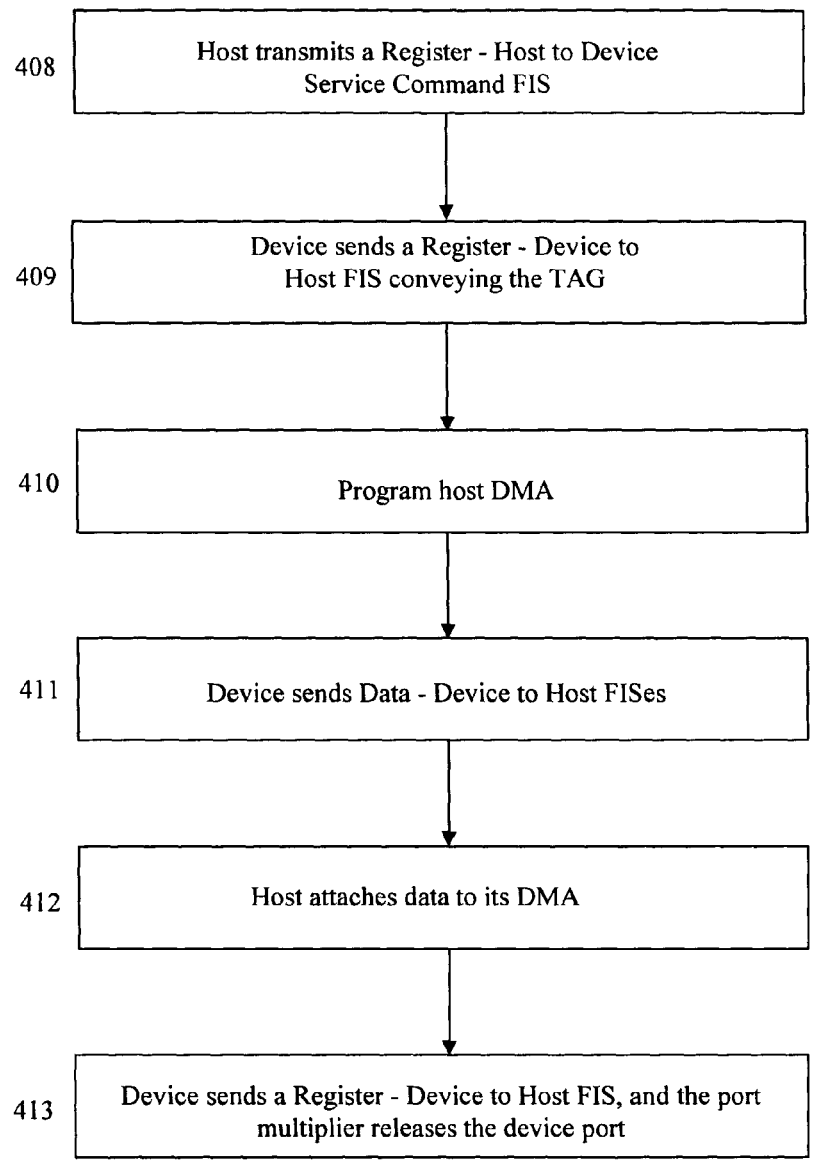
Figure 4C:
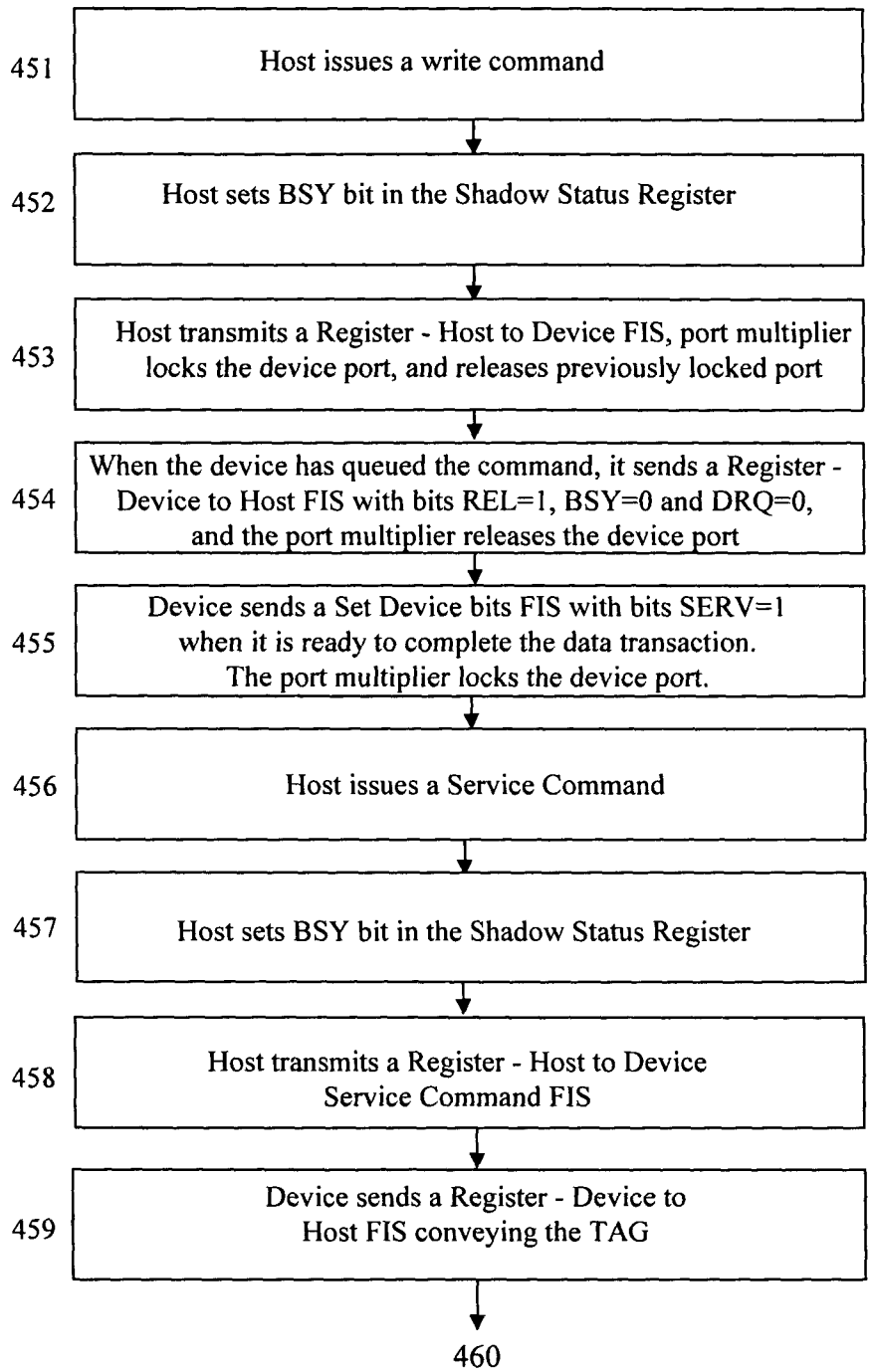
FIGS. 4C and 4D show a flow chart for a write operation of a queued command-based switching serial-ATA port multiplier supporting both NCQ operation mode and QDMA operation mode according to one embodiment of the present invention.
Figure 4D:
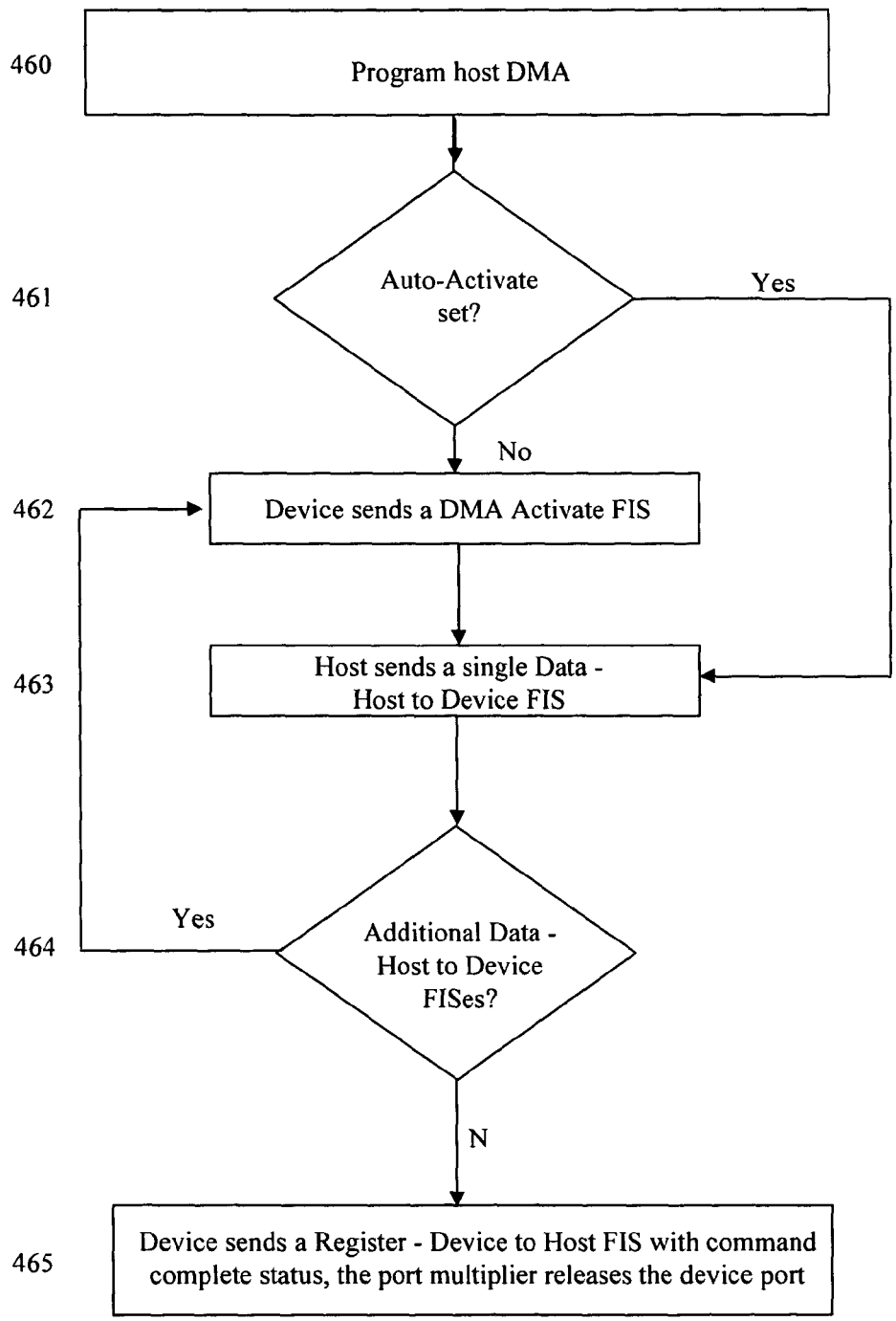

In another embodiment, a queued command-based switching serial-ATA port multiplier of the present invention supports both the QDMA operation mode and the NCQ operation mode. FIGS. 4A and 4B show a flow chart for a read operation of such a serial-ATA port multiplier, and FIGS. 4C and 4D show a flow chart for a write operation of such a serial-ATA port multiplier. Steps 401, 402 and 403 are similar to steps 201-203 in FIG. 2. Steps 410, 411 and 412 are similar to steps 206-208 in FIG. 2. Steps 451, 452 and 453 are similar to steps 301-303 in FIG. 3, and steps 460-464 are similar to steps 306-310 in FIG. 3. For the sake of brevity, only steps which differ from those shown in FIGS. 2, 3A and 3B will be described here.

During a read operation, when the device has queued the command, it sends a Register—Device to Host FIS with bits REL=1, BSY=0 and DRQ=0 at step 404. At step 405, when the device is ready to complete the data transaction, it sends Set Device bits FIS with bits SERV=1, and the port multiplier locks the device port. Then the host issues a Service Command at step 406, sets BSY bit in the Shadow Status Register at step 407, and transmits a Register—Host to Device Service Command FIS to the device at step 408. At step 409, the device sends a Register—Device to Host FIS conveying a tag of the command to be performed. At step 413, when the data transfer is completed, the device sends a Register—Device to Host FIS with command complete status, and the port multiplier releases the device port.

Similarly, during a write operation, when the device has queued the command, it sends a Register—Device to Host FIS with bits REL=1, BSY=0 and DRQ=0 at step 454. At step 455, when the device is ready to complete the data transaction, it sends Set Device bits FIS with bits SERV=1, and the port multiplier locks the device port. Then the host issues a Service Command at step 456, sets BSY bit in the Shadow Status Register at step 457, and transmits a Register—Host to Device Service Command FIS to the device at step 458. At step 459, the device sends a Register—Device to Host FIS conveying the TAG of the command to be performed. At step 465, when the data transfer is completed, the device sends a Register—Device to Host FIS with command complete status, and the port multiplier releases the device port.

Thus, the port multiplier of the present invention allows a host, which does not support FIS-based switching, to issue multiple Native Command Queuing commands and/or Queued DMA commands to multiple serial-ATA devices. The port multiplier can use a number of registers to carry out the locking mechanism of the present invention, e.g., a port multiplier Lock Control Register and a port multiplier Lock Status Register.

Figure 13:
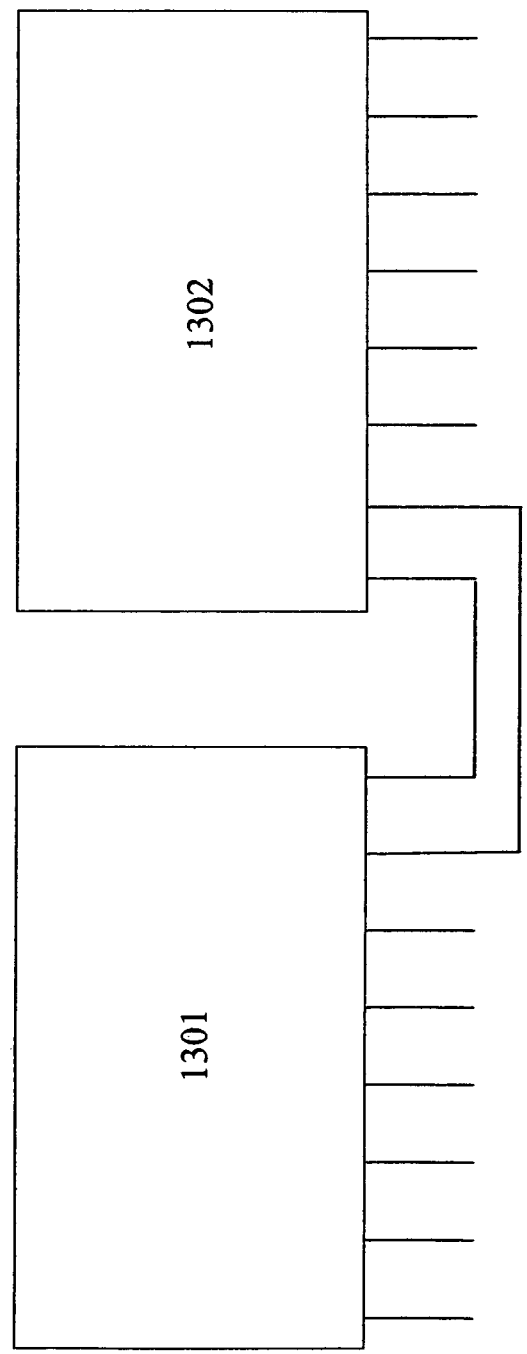
FIG. 13 shows a block diagram of a port multiplier according to another embodiment of the present invention.

One embodiment of the port multiplier of the present invention comprises two serial-ATA host controllers, which communicate with each other via a serial-ATA interface. FIG. 13 shows a block diagram of a port multiplier according to such an embodiment. The two communication channels between serial-ATA host controller cards 1301 and 1302 use the serial-ATA interface described above. Other ports of the two cards are used to connect devices. Such a configuration is described in detail in U.S. application Ser. No. 10/667,197 filed on the same day as the present application, which is incorporated herein by reference.

III. Host Controller for Queued Command-Based Switching—NCQ

Figures 5A, 5B:
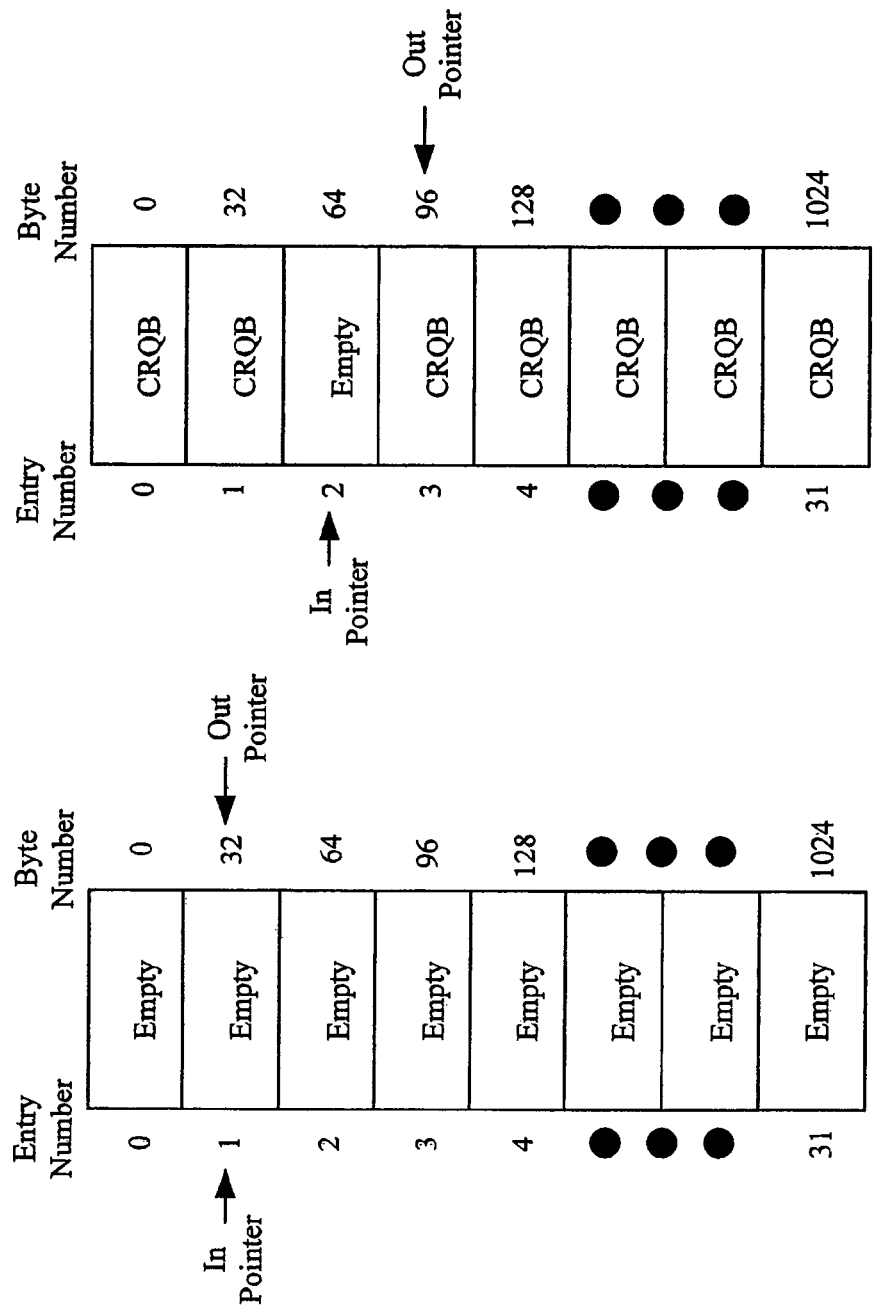
FIGS. 5A-5B show a command request status according to one embodiment of the present invention.

FIGS. 5A-5B show a command request status according to one embodiment of the present invention. The Command Request Queue is the interface that the CPU uses to request a data transaction between the host and the devices. The Command Request Queue is a 32-entry long, circular queue (FIFO) whose location is configured by a Request Queue In-pointer Register and a Request Queue Out-pointer Register. A queue is empty when the Request Queue Out-pointer reaches the Request Queue In-pointer as shown in FIG. 5A, and a queue is full when the Request Queue In-pointer is written with the same value as the Request Queue Out-pointer. For example, FIG. 5B shows a queue which has one empty block; addition of another 32-byte Command Request Block (CRQB) would result in the Request Queue In pointer being written with the same value (Entry 3) as the Request Queue Out-pointer. A queue contains N entries when the request Queue Out-pointer is N less than the Request Queue In-pointer, taking into account a wraparound condition. Each entry, a 32-byte Command Request Block (CRQB), contains DMA parameters and commands for the device. The CRQB data structure is written by the CPU, and involves a number of registers, e.g., ID registers, Flag registers, and Time Stamp registers. The Command Request Queue provides the tag of a command. In one embodiment, the tag of a command corresponds to the location of an entry in the Command Request Queue.

In addition, the physical memory region to be transferred is described by the Physical Region Descriptor (PRD). The data transfer proceeds until all regions described by the PRDs in the table have been transferred.

Figures 5C, 5D:
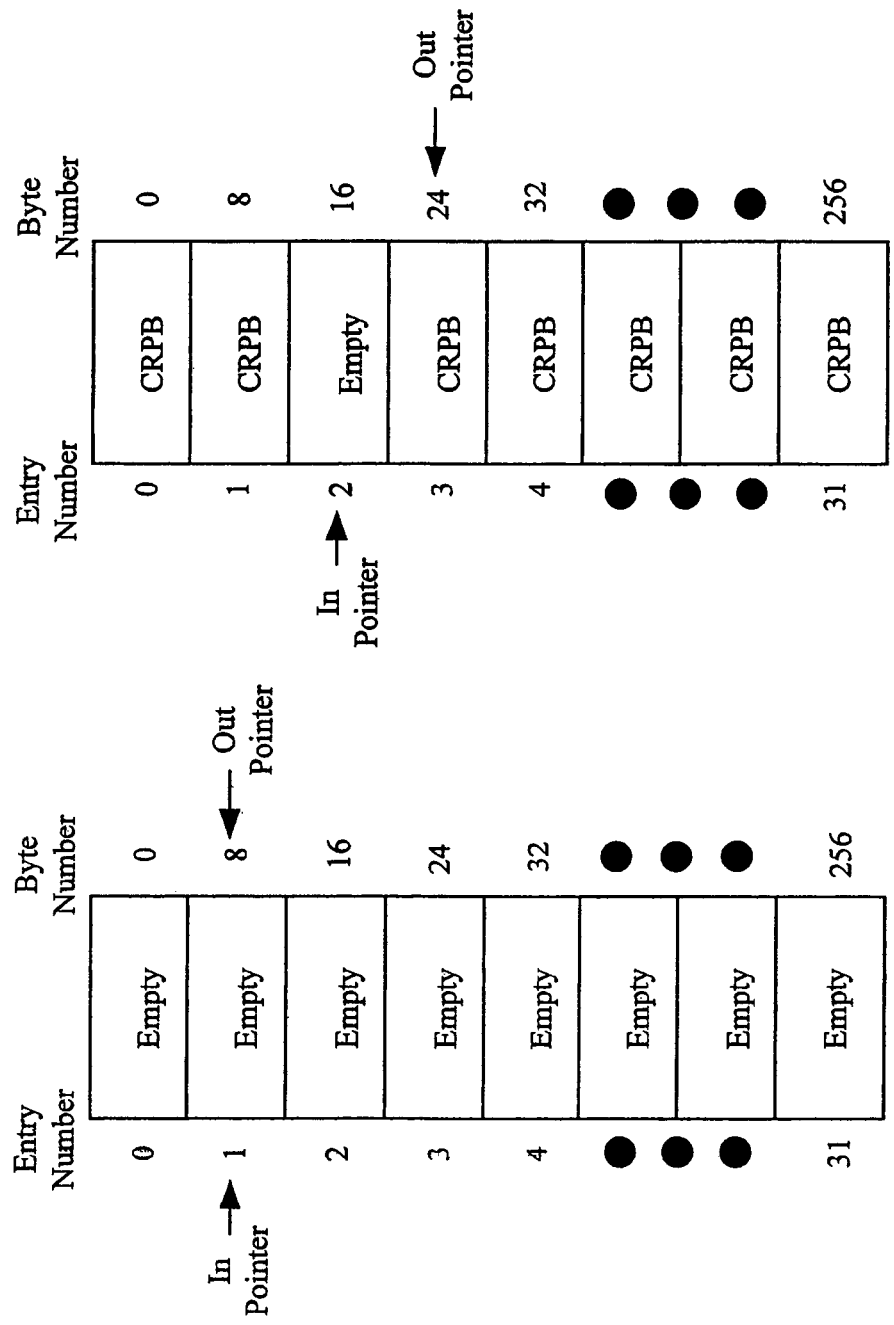
FIGS. 5C-5D show a command response status according to one embodiment of the present invention.

FIGS. 5C-5D show a command response status according to one embodiment of the present invention. The response queue is the interface that the DMA uses to notify the CPU that a data transaction between the host and the device has been completed. The response queue is a 32-entry long, circular queue (FIFO) whose location is configured by the Response Queue In-Pointer Register and the Response Queue Out-pointer Register. A queue is empty when the Response Queue Out-pointer reaches the Response Queue In-pointer as shown in FIG. 5C, and a queue is full when Response Queue In-pointer is written with same value as a Response Queue Out-pointer. For example, FIG. 5D shows a queue which has one empty block; addition of another 8-byte Command Response Block (CRPB) would result in the Request Queue In-pointer being written with the same value (Entry 3) as the Request Queue Out-pointer. A queue contains N entries when the Response Queue Out-pointer is N less than the Response Queue In-pointer, taking into account wraparound condition. Each entry is a 8-byte Command Response Block (CRPB).

FIG. 6 shows a Register—Host to Device FIS issued by a NCQ host controller used for queued command-based switching according to one embodiment of the present invention. As shown, the FIS contains the port address of the device in the PM Port Field, and the TAG of the command in the Sector Count Field.

Figure 7:
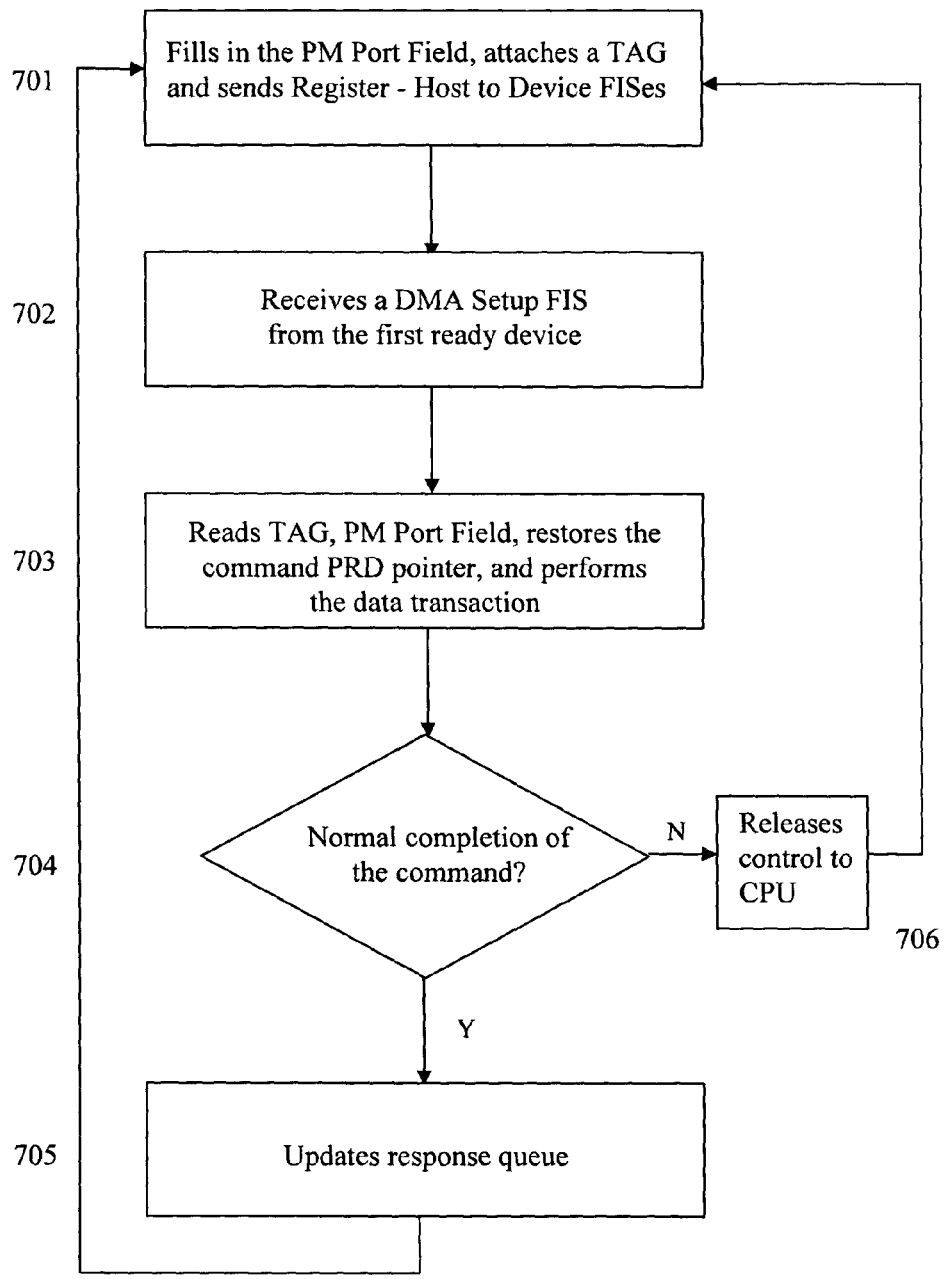
FIG. 7 shows a flow chart for the operation of a NCQ host controller used for queued command-based switching according to one embodiment of the present invention.

FIG. 7 shows a flow chart for the operation of a NCQ host controller used for queued command-based switching according to one embodiment of the present invention.

At step 701, the NCQ host controller sends a queue of up to 32 commands via Register—Host to Device FISes to multiple serial-ATA devices via a serial-ATA port multiplier. The NCQ host controller attaches to each of the FISes a TAG provided in the CRQB as the tag of the command, and the port address of a device. The NCQ host controller stores the PRD pointer of each queued FIS.

Whenever a device is ready to perform one of the NCQ commands, regardless of its order in the queue, it sends to the host controller a DMA Setup FIS at step 702. The A Setup FIS notifies the host controller with the TAG of the command. Also, the port multiplier provides the port address of device sending the DMA Setup FIS.

At step 703, the host controller reads the TAG and the port address of the device, restores the command PRD pointer, and performs the data transaction indicated by the TAG with the device indicated by the port address.

At step 704, the host controller checks status registers in the device to verify normal completion of the command.

If the command is successfully completed, the host controller updates the response queue at step 705, and then returns to step 701. Otherwise, the host controller generates an interrupt, releases control of the device to the CPU at step 706, and returns to step 701.

In this embodiment, the device sends the TAG back to the host. It should be understood that the device can send to the host other type of information identifying the command that the device is ready to perform.

When a NCQ host controller is used to send a queue of commands to only one device, the serial-ATA port multiplier is not involved, and operations related to PM Port Field and device port address can be omitted.

IV. Queued Command-Based Switching—QDMA

The Queued Command-based switching of the present invention supports Queued DMA commands (QDMA), which is also called Tag Command Queuing (TCQ).

QDMA commands allow the CPU to issue concurrent commands to a device. Along with the command, the host controller provides a tag to uniquely identify the command. When the device is ready to perform one of the QDMA commands, regardless of the command's order in the queue, it sends a Set Device bits FIS. In response to a Service Command from the host, the device then notifies the host controller with the TAG of the command. After that, the host controller identifies the command according to the TAG and restores the command parameters to execute the data transaction. A serial-ATA device supports up to 32 concurrent QDMA commands and may perform them out of order. When a port multiplier is used, the QDMA command of the present invention also contains a device port number in the PM Port Field, and consequently can issue multiple QDMA commands to multiple devices.

The read and write operations of queued command-based switching for QDMA operation mode are shown in FIGS. 4A to 4D. One difference between NCQ and QDMA operation modes is that a device in the QDMA operation mode sends Set Device bits FIS with its SERV bit set, instead of DMA Setup FIS, when it is ready to execute a QDMA command. Another difference is that the host controller in the QDMA operation mode issues Service Commands to the device upon receipt of the Set Device bits FIS by transmitting a Register—Host to Device Service Command FIS to the device. In response, the device sends a Register—Device to Host FIS conveying the TAG of the command to be performed with its DRQ bit set. When the data transfer is successfully completed, the device sends a Register—Device to Host FIS with command complete status, BSY=0 and DRQ=0, and the port multiplier releases the device port.

V. Host Controller for Queued Command-Based Switching—QDMA

Figure 8:
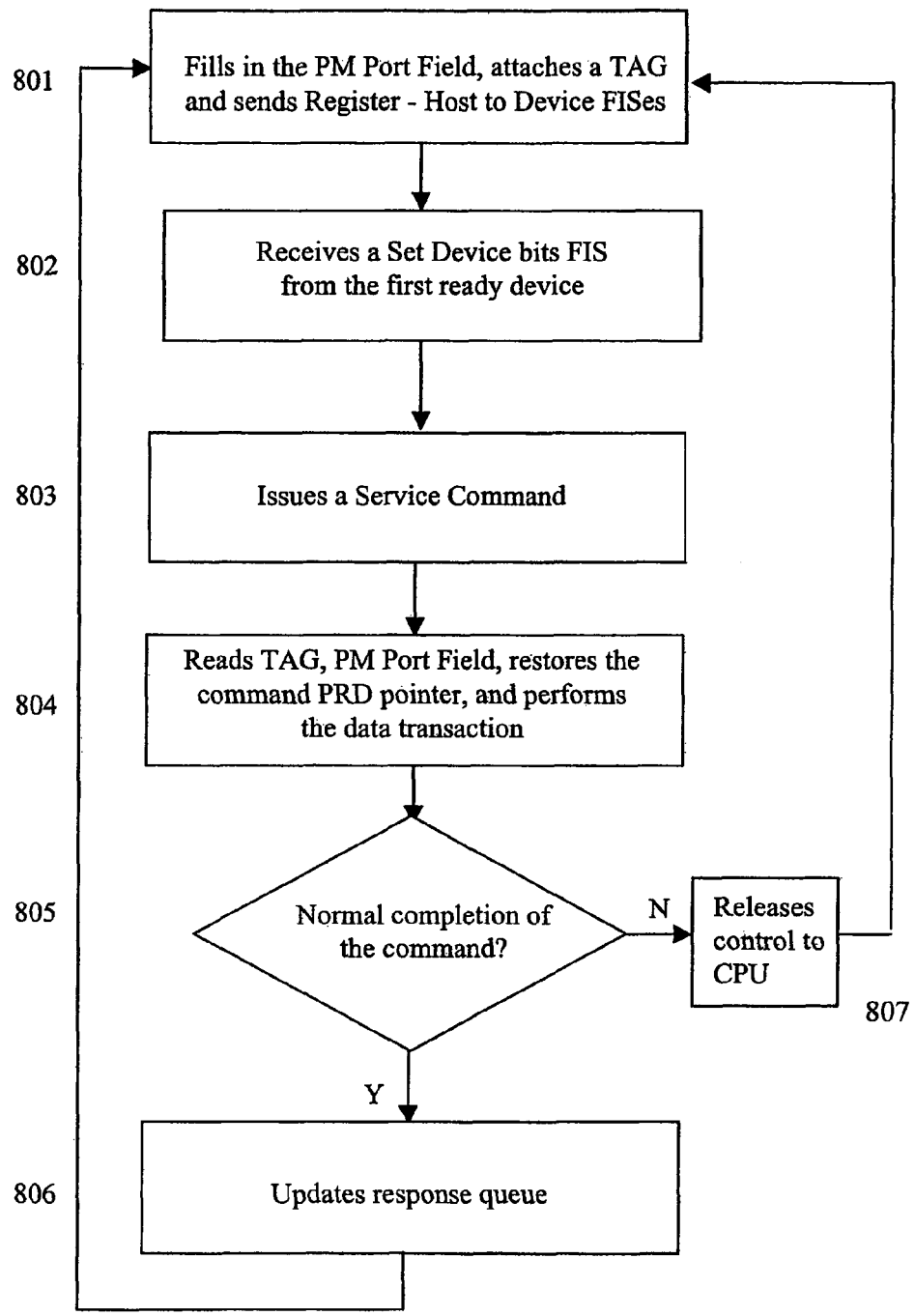
FIG. 8 shows a flow chart for the operation of a QDMA host controller in queued command-based switching according to one embodiment of the present invention.

FIG. 8 shows a flow chart for the operation of a QDMA host controller in queued command-based switching according to one embodiment of the present invention.

At step 801, the QDMA host controller sends a queue of up to 32 commands via Register—Host to Device FISes to multiple serial-ATA devices. The QDMA host controller attaches to each of the FISes a tag provided in the CRQB as the tag of the command, and port address of a device. The QDMA host controller stores the PRD pointer of each queued FIS.

Whenever a device is ready to perform one of the QDMA commands, regardless of its order in the queue, it sends to the host controller a Set Device bits FIS with its SERV bits set at step 802.

At step 803, the QDMA host controller issues Service Command to the device by a Register—Host to Device Service Command FIS. At step 804, the host controller reads the TAG of the command to be performed from a Register—Device to Host FIS from the device and the port address of the device, restores the command PRD pointer, and performs the data transaction indicated by the TAG with the device indicated by the port address.

At step 805, the host controller checks status registers in the device to verify normal completion of the command.

If the command is successfully completed, the host controller updates the response queue at step 806, and then returns to step 801. Otherwise, the host controller generates an interrupt, releases control of the device to the CPU at step 807, and returns to step 801.

Again, when a QDMA host controller is used to send a queue of commands to only one device, the serial-ATA port multiplier is not involved, and operations related to PM Port Field and device port address can be omitted.

VI. Non-Queued Commands

The port multiplier of the present invention is compatible with non-queued commands, wherein the host issues next command to a device only when the previous command has completed. In such a case, the port multiplier locks a device port when it receives a Register—Host to Device FIS.

VII. Host Controller for Queued Command-Based Switching—Supporting both NCQ and QDMA In one embodiment of the present invention, the host controller for queued command-based switching supports both NCQ operation mode and QDMA operation mode.

Figure 9:
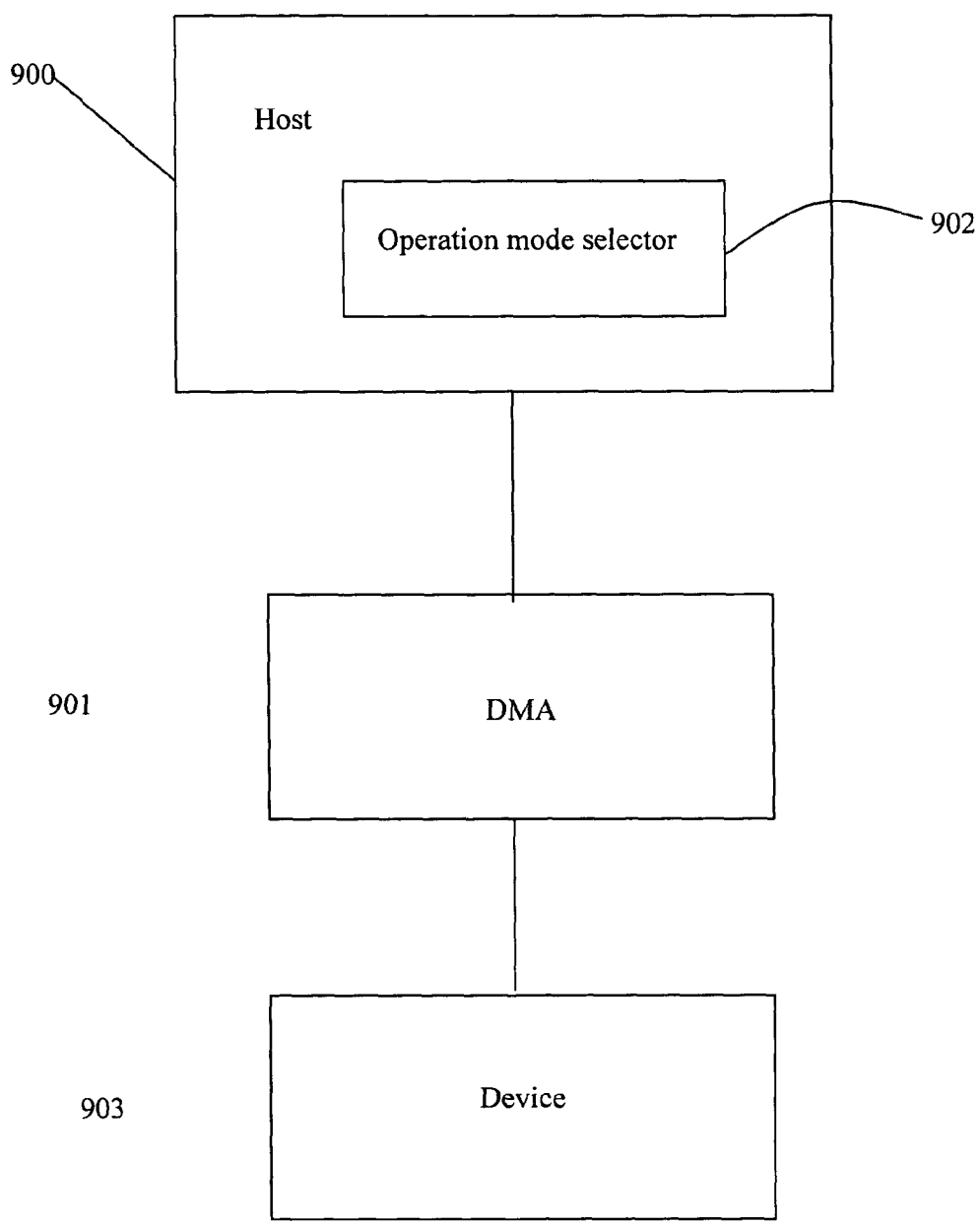
FIG. 9 shows a block diagram of the operation mode selection module of a host.

FIG. 9 shows a block diagram of the operation mode selection module of a host. A DMA 901 supports all operation modes: NCQ, QDMA, and non-queued DMA. The DMA 901 can work as state machine for each of operation modes, but can support one operation mode at a time. The DMA 901 controls the host DMA, the host transport layer and a device 903. A host 900 tests the capability of the device 903 by Identity Device commands, and an operation mode selector 902 selects an operation mode that best fits the device according to predetermined priorities. In one embodiment, the priority sequence is as follows: NCQ, QDMA, and non-queued DMA. The host 900 then configures the DMA 901 according to the selected operation mode. When a specific operation mode is selected, the host 900 is allowed to insert into the CRQB only the associated group of commands corresponding to this operation mode. In one embodiment, the host software is in charge of testing device capability and selecting operation mode. It should be understood that hardware could have similar functions.

Figure 10:
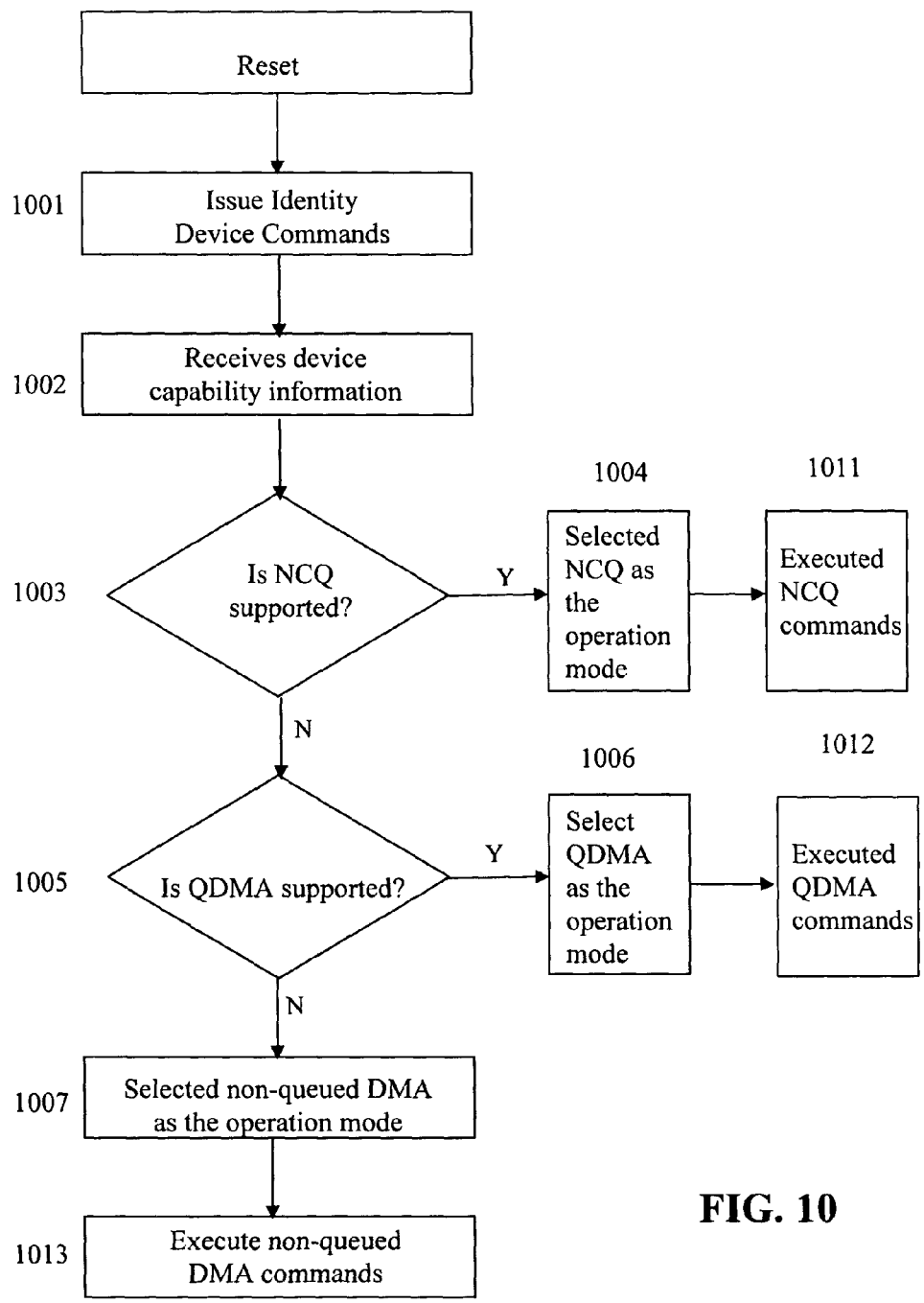
FIG. 10 shows a flow chart of a method used by a host controller to select an operation mode according to one embodiment of the present invention.

FIG. 10 shows a flow chart of a method used by a host controller to select an operation mode according to one embodiment of the present invention.

Looking at a hard disk drive as an example of a serial-ATA device, each hard disk drive has a command set which defines how to work with the particular drive. During the initialization process of a hard disk drive, when the DMA 901 is disabled, the host 900 issues Identity Device commands at step 1001. The disk drive informs the host 900 of its capability at step 1002. Based on such capability information, at step 1003, the host 900 decides whether NCQ is an operation mode supported by the disk drive. If yes, NCQ is selected as the operation mode at step 1004 and the process goes to step 1011, where the host 900 adjusts the disk drive to NCQ operation mode by SET FEATURES commands, adjusts the DMA 901 to NCQ operation mode, inserts NCQ commands into CRQB, and executes NCQ commands. If NCQ is not supported, it is determined at step 1005 whether QDMA is an operation mode supported by the disk drive. If yes, QDMA is selected as the operation mode at step 1006, and the process goes to step 1012, where the host 900 adjusts the disk drive to QDMA operation mode by SET FEATURES commands, adjusts the DMA 901 to QDMA operation mode, inserts QDMA commands into CRQB, and executes QDMA commands. If QDMA is not supported, non-queued DMA is selected as the operation mode at step 1007, and the process goes to step 1013, where the DMA 901 executes non-queued DMA commands. Accordingly, the selection of operation mode is a part of the initialization process of the serial-ATA device.

QDMA and NCQ are two types of commands currently known for Queued Command-based Switching. It should be understood that the host controller of the present invention can be used for other types of commands for Queued Command-based Switching. In addition, the host controller of the present invention uses a number of registers to generate, transmit and receive the FISes involved.

Figure 11:
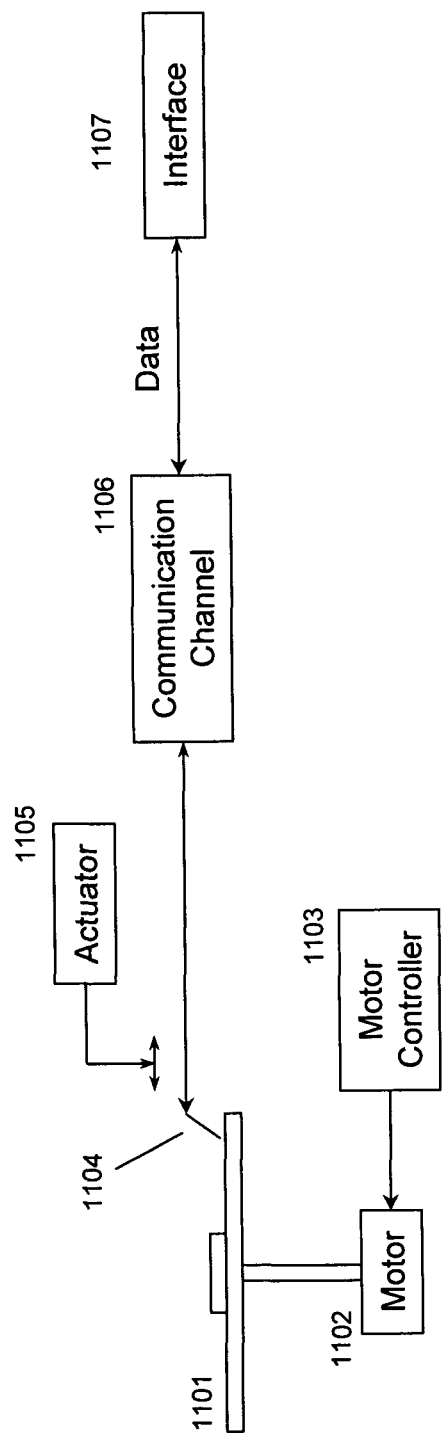
FIG. 11 shows a disk drive as an example of a serial-ATA device to which the present invention is applicable.

Finally, FIG. 11 shows a disk drive as an example of a serial-ATA device to which the present invention is applicable. As shown in FIG. 11, an exemplary hard disk drive system comprises a disk 1101. A motor 1102 spins the disk 1101 at a substantially constant speed and under control of a motor controller 1103. An actuator 1104 positions a recording head 1105 over the proper data track on the disk 1101. Data is transmitted through the recording head 1105 via a communications channel 1106. The communications channel 1106 communicates with a host through a serial-ATA interface 1107. Skilled practitioners in the art will recognize that other disk drive configurations are possible.

Figure 12:
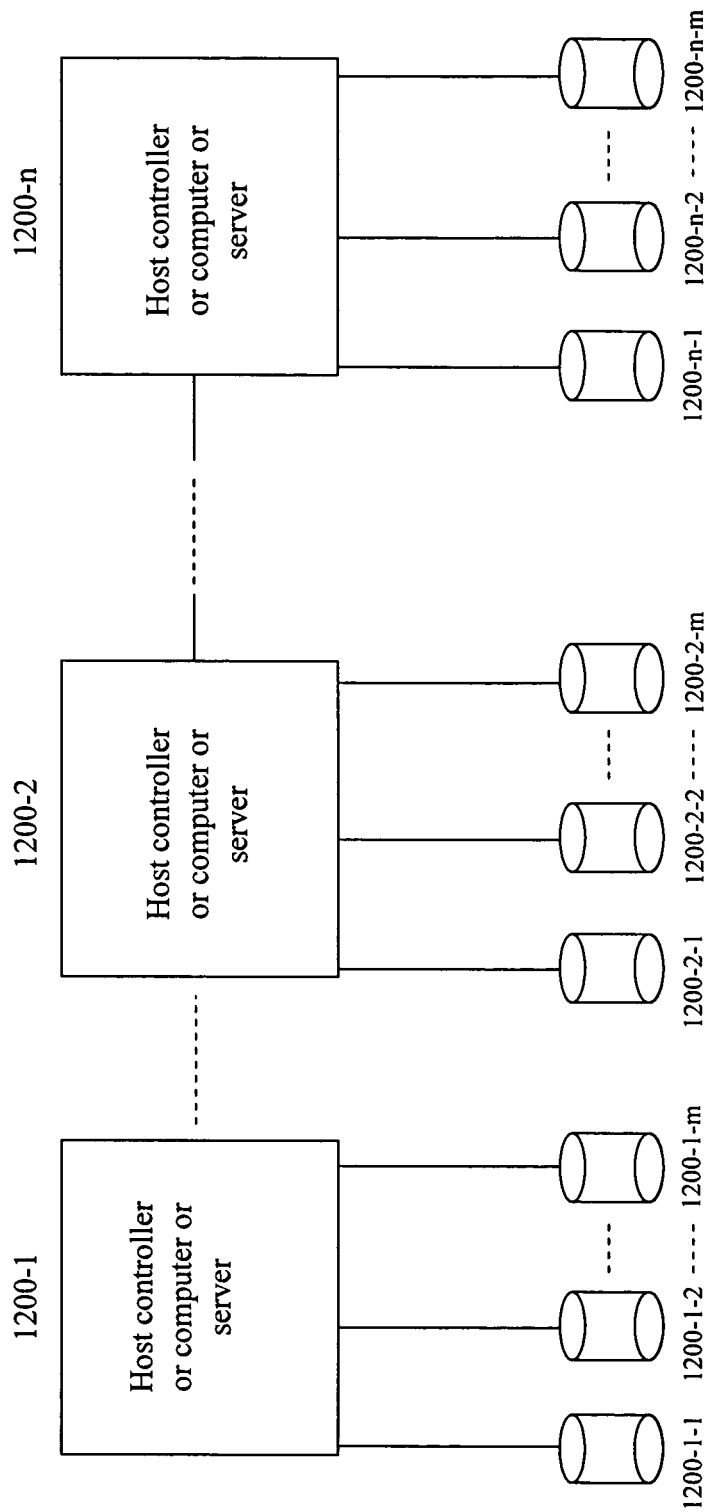
FIG. 12 shows an embodiment of a serial-ATA system employing one or more serial-ATA host controllers according to the present invention.

The host controller described herein has application in many different kinds of systems, from computers and servers, to network attached storage (NAS) systems, storage area networks (SAN), redundant arrays of inexpensive disks (RAID), and JBOD (Just a Bunch of Disks). FIG. 12 shows an embodiment of a serial-ATA system employing one or more serial-ATA host controllers according to the present invention. FIG. 12 shows a plurality of host controllers or computers or servers 1200-1 to 1200-n. Each host controller or computer or server 1200-n is in communication with a plurality of serial-ATA devices 1200-n-1 to 1200-n-m (e.g., element 1200-1 is in communication with serial-ATA devices 1200-1-1 to 1200-1-m; element 1200-2 is in communication with serial-ATA devices 1200-2-1 to 1200-2-m; element 1200-n is in communication with serial-ATA devices 1200-n-1 to 1200-n-m). Each element 1200-1 to 1200-n may function as a stand-alone host controller, computer, or server. The serial-ATA devices 1200-1-1 to 1200-1-m, for example, may be attached in either a RAID or a JBOD configuration, as skilled artisans will appreciate. In addition, the elements 1200-1 to 1200-n may function by themselves to provide a NAS configuration, or may be connected together in various SAN configuration, again as known to skilled artisans. The invention is not limited to specific stand-alone, NAS, or SAN configuration. Skilled artisans will appreciate readily that such host controllers will work with many types of storage systems and configurations, as well as with systems employing other types of Serial-ATA devices.

The Serial-ATA 1.0 Specification and Serial-ATA II PM 1.0 Specification are incorporated herein by reference. It should be understood that the present invention is intended to apply to serial-ATA devices configured according to these Specifications, all preceding Serial-ATA Specifications, and also all succeeding Serial-ATA Specifications.

While the invention has been described in detail above with reference to some embodiments, variations within the scope and spirit of the invention will be apparent to those of ordinary skill in the art. Thus, the invention should be considered as limited only by the scope of the appended claims.

What is claimed is:

1. A method for controlling data transfer in a serial-ATA system, the method comprising:
   using serial-ATA Native Command Queuing (NCQ) concurrently issuing, from a host, a queue of NCQ commands to at least two serial-ATA devices, the NCQ commands including a first plurality of NCQ commands for a first one of the at least two devices and a second plurality of NCQ commands for a second one of the at least two devices, each of the NCQ commands including a respective port address of one of the at least two devices and a first command identifier identifying a command for the one of the at least two devices, the respective port address and the first command identifier being assigned by the host;
   receiving a first acknowledgement, which has a port address of a first target device and a second command identifier identifying a first outstanding command for the first target device; and
   sending the first outstanding command to the first target device;
   wherein each of the queues of NCQ commands is sent to the at least two serial-ATA devices prior to receiving the first acknowledgement.

2. The method according to claim 1, wherein the acknowledgement is a Direct Memory Access (DMA) Setup Frame Information Structure (FIS).

3. The method according to claim 1, wherein the acknowledgement is a Set Device bits Frame Information Structure (FIS).

4. The method according to claim 1, wherein the queue of NCQ commands is communicated to the at least two devices via a serial-ATA port multiplier.

5. The method according to claim 4, wherein the serial-ATA port multiplier communicates a command to a device according to the respective port address.

6. The method according to claim 4, wherein the serial-ATA port multiplier provides the port address of the first target device.

7. The method according to claim 1, wherein the first command identifier corresponds to a command's location in the queue.

8. The method according to claim 1, wherein the outstanding command is determined by the second command identifier's location in the queue.

9. The method according to claim 1, wherein the queue is a circular queue.

10. The method according to claim 1, wherein the queue has a queue in-pointer and a queue out-pointer.

11. The method according to claim 10, wherein the queue is empty when the queue out-pointer reaches the queue in-pointer.

12. The method according to claim 10, wherein the queue is full when the queue in pointer is written with the same value as the queue out-pointer.

13. The method according to claim 1, wherein the outstanding command further comprises a physical memory region identifier identifying a memory location to be transferred.

14. The method according to claim 1, wherein the target device is a disk drive.

15. A serial-ATA host controller, comprising:
a signal generator, located on the host controller, concurrently issuing, using Native Command Queuing (NCQ), a queue of NCQ commands to at least two serial-ATA devices, the NCQ commands including a first plurality of NCQ commands for a first one of the at least two devices and a second plurality of NCQ commands for a second one of the at least two devices, each of the NCQ commands including a respective port address of one of the at least two devices and a first command identifier identifying a command for the one of the at least two devices, the signal generator assigning the respective port address and the first command identifier;
a receiver receiving an acknowledgement, the acknowledgement having a port address of a target device and a second command identifier identifying an outstanding command for the target device; and
a selector selecting the outstanding command to the target device;
wherein the serial-ATA host controller operates via serial-ATA queued command-based switching; and
wherein the signal generator issues the queues of NCQ commands to the at least two serial-ATA devices prior to the receiver receiving the acknowledgement.

16. The serial-ATA host controller according to claim 15, wherein the acknowledgement is a Direct Memory Access (DMA) Setup Frame Information Structure (FIS).

17. The serial-ATA host controller according to claim 15, wherein the acknowledgement is a Set Device bits Frame Information Structure (FIS).

18. The serial-ATA host controller according to claim 15, wherein the signal generator communicates the queue of NCQ commands to the at least two devices via a serial-ATA port multiplier.

19. The serial-ATA host controller according to claim 18, wherein the serial-ATA port multiplier communicates a command to a device according to the respective port address.

20. The host controller according to claim 18, wherein the receiver receives the port address of the target device from the serial-ATA port multiplier.

21. The host controller according to claim 15, wherein the first command identifier corresponds to a command's location in the queue.

22. The host controller according to claim 15, wherein the outstanding command is determined by the second command identifier's location in the queue.

23. The host controller according to claim 15, wherein the queue is a circular queue.

24. The host controller according to claim 15, wherein the queue has a queue in-pointer and a queue out-pointer.

25. The host controller according to claim 24, wherein the queue is empty when the queue out-pointer reaches the queue in-pointer.

26. The host controller according to claim 24, wherein the queue is full when the queue in-pointer is written with the same value as the queue out-pointer.

27. The host controller according to claim 15, wherein the outstanding command further comprises a physical memory region identifier.

28. The host controller according to claim 15, wherein the target device is a disk drive.

29. The host controller of claim 15, as implemented in a system selected from the group consisting of a computer, a server, a storage area network (SAN), a network attached storage (NAS) system, or a system employing RAID (Redundant Array of Inexpensive Disks) or JBOD (Just a Bunch of Disks).

30. A serial-ATA system, comprising:
a signal generator located on a host of the system, the signal generator concurrently issuing, using Native Command Queuing (NCQ), a queue of NCQ commands to at least two devices, the NCQ commands including a first plurality of NCQ commands for a first one of the at least two devices and a second plurality of NCQ commands for a second one of the at least two devices, each of the NCQ commands including a respective port address of one of the at least two devices and a first command identifier identifying a command for the one of the at least two devices, the signal generator assigning the respective port address and the first command identifier;
a receiver receiving an acknowledgement, which has a port address of a target device and a second command identifier identifying an outstanding command for the target device;
a transmitter sending the outstanding command to the target device; and
a serial-ATA port multiplier providing the port address of the target device;
wherein the signal generator is to issue the queues of NCQ commands to the at least two devices prior to the receiver receiving the acknowledgement.

31. The system according to claim 30, wherein the acknowledgement is a Direct Memory Access (DMA) Setup Frame Information Structure (FIS).

32. The system according to claim 30, wherein the acknowledgement is a Set Device bits Frame Information Structure (FIS).

33. The system according to claim 30, wherein the signal generator communicates the queue of NCQ commands to the at least two devices via the serial-ATA port multiplier.

34. The system according to claim 30, wherein the serial-ATA port multiplier communicates a command to a device according to the respective port address.

35. The system according to claim 30, wherein the first command identifier corresponds to a command's location in the queue.

36. The system according to claim 30, wherein the outstanding command is determined by the second command identifier's location in the queue.

37. The system according to claim 30, wherein the queue is a circular queue.

38. The system according to claim 30, wherein the queue has a queue in-pointer and a queue out-pointer.

39. The system according to claim 38, wherein the queue is empty when the queue out-pointer reaches the queue in-pointer.

40. The system according to claim 38, wherein the queue is full when the queue in-pointer is written with the same value as the queue out-pointer.

41. The system according to claim 30, wherein the outstanding command further comprises a physical memory region identifier.

42. The system according to claim 30, wherein the target device is a disk drive.

43. The system according to claim 30, wherein the serial-ATA port multiplier comprises a first serial-ATA host controller and a second serial-ATA host controller communicating with each other via a serial-ATA interface.

44. The system of claim 30, as implemented in a system selected from the group consisting of a computer, a server, a storage area network (SAN), a network attached storage (NAS) system, or a system employing RAID (Redundant Array of Inexpensive Disks) or JBOD (Just a Bunch of Disks).

* * * * *